United States Patent
Tateno

(10) Patent No.: US 9,054,824 B2
(45) Date of Patent: Jun. 9, 2015

(54) INTER-FRAME GAP CONTROLLER, TRAFFIC TRANSMITTER, TRANSMISSION APPARATUS AND INTER-FRAME GAP CONTROL METHOD

(75) Inventor: Yasushi Tateno, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 319 days.

(21) Appl. No.: 13/370,806

(22) Filed: Feb. 10, 2012

(65) Prior Publication Data

US 2012/0140673 A1 Jun. 7, 2012

Related U.S. Application Data

(63) Continuation of application No. PCT/JP2009/065347, filed on Sep. 2, 2009.

(51) Int. Cl.
*G01R 31/08* (2006.01)
*H04J 3/16* (2006.01)
*H04L 12/815* (2013.01)
*H04L 29/08* (2006.01)

(52) U.S. Cl.
CPC ............... *H04J 3/1617* (2013.01); *H04L 47/22* (2013.01); *H04L 69/324* (2013.01)

(58) Field of Classification Search
CPC .......... H04L 47/10; H04L 47/35; H04L 43/50
USPC ............... 370/230, 230.1, 235, 252, 401, 466
See application file for complete search history.

(56) References Cited

U.S. PATENT DOCUMENTS

| 7,095,737 | B2* | 8/2006 | Lo .................................. 370/389 |
| 7,359,964 | B2* | 4/2008 | Roe et al. ........................ 709/224 |
| 7,394,835 | B2* | 7/2008 | Youn et al. ..................... 370/535 |
| 7,593,327 | B2* | 9/2009 | Bordogna et al. ............. 370/230 |
| 8,467,417 | B2* | 6/2013 | Lamothe et al. ............... 370/503 |
| 8,589,576 | B2* | 11/2013 | Tanaka et al. .................. 709/231 |
| 2003/0043861 | A1 | 3/2003 | Saito |
| 2008/0101406 | A1 | 5/2008 | Matoba |
| 2009/0169218 | A1 | 7/2009 | Nonaka et al. |

FOREIGN PATENT DOCUMENTS

| JP | 4-336831 | 11/1992 |
| JP | 2003-78496 | 3/2003 |
| JP | 2005-136648 | 5/2006 |
| JP | 2008-113117 | 5/2008 |
| JP | 2009-124446 | 6/2009 |

OTHER PUBLICATIONS

International Search Report for PCT/JP2009/065347 mailed Oct. 6, 2009.

* cited by examiner

Primary Examiner — Ricky Ngo
Assistant Examiner — Christine Ng
(74) Attorney, Agent, or Firm — Staas & Halsey LLP

(57) ABSTRACT

An inter-frame gap controller 12 includes an inter-frame gap length determiner 13 that determines the length of inter-frame gap based on traffic volume of Ethernet frames which are converted to synchronous frames and transmitted over synchronous network 4, and a gap inserter 14 that inserts the inter-frame gap of the length determined by the inter-frame gap length determiner 13 between Ethernet frames which are converted from the synchronous frames.

11 Claims, 17 Drawing Sheets

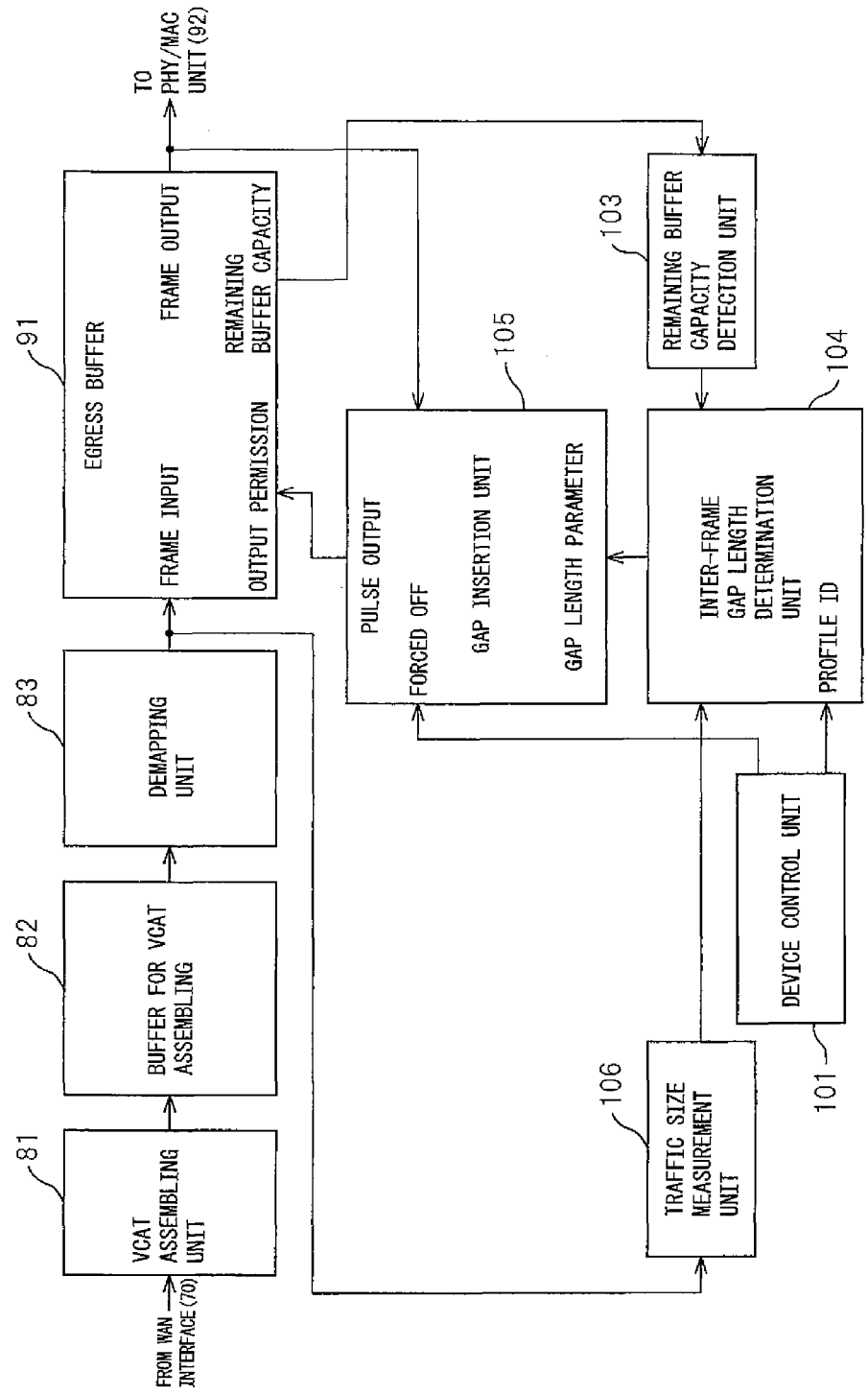

INTER-FRAME GAP CONTROLLER, TRAFFIC TRANSMITTER, TRANSMISSION APPARATUS AND INTER-FRAME GAP CONTROL METHOD

CROSS-REFERENCE TO RELATED APPLICATIONS

The present application is a continuation application based on International application No. PCT/JP2009/065347, filed on Sep. 2, 2009, the entire contents of which are incorporated herein by reference.

FIELD

Embodiments considered herein relate to a technology for controlling inter-frame gap for Ethernet frames.

BACKGROUND

As an example of a configuration for connection of an Ethernet frame transmission apparatus to a Wide Area Network (WAN) line, a Wide Area Ethernet network configuration or a synchronous network configuration has been known. In a Wide Area Ethernet Network configuration, Ethernet frames are directly transmitted over WAN using a L2 transmission apparatus, a L2 switch, or a L3 switch. In a synchronous network configuration, Ethernet frames are transmitted over a synchronous network such as SONET/SDH network.

A bandwidth control device has been proposed which includes a frame retaining unit that retains request frames in the reception frames for requesting data transmission from another processing device, a response measuring unit that measures the size of response frames in reception frames containing data transmitted from another processing device receiving the data transmission request, and calculates, based on the measured size, the predictive traffic volume defined as the size of the traffic of the response frames predicted to be received as a response to the request frames, and a bandwidth control unit that which based on the predictive traffic volume calculated by the response measuring unit, controls traffic rate of the request frames by adjusting timing of transmission of the request frames retained by the frame retaining unit. With this bandwidth control device, it is possible, by calculating predictive traffic volume, to control traffic rate of response frames indirectly by traffic rate control of request frame. Since the size of response frames including requested data is usually larger than the size of the request frames, it is possible with this bandwidth control device to control larger traffic volume with smaller buffer consumption. Also, with this bandwidth control device, with a buffer size comparable to a conventional bandwidth control device, it is possible to deal with far larger number of users and much greater traffic volume while preventing delay or discarding due to congestion.

Related art is disclosed in Japanese Laid-open Patent Publication No. 2008-113117.

SUMMARY

According to an embodiment, an inter-frame gap controller is provided. The inter-frame gap controller includes an inter-frame gap length determiner that determines the length of the inter-frame gap based on the traffic volume of Ethernet frames converted to synchronous frames and transmitted over a synchronous network, a gap inserter that inserts an inter-frame gap of the length determined by the inter-frame gap length determiner between Ethernet frames which are converted from the synchronous frames.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 17 is a view illustrating the operation of the control unit depicted in FIG. 16.

DESCRIPTION OF EMBODIMENTS

As has been described above, in the conventional configuration for transmission of Ethernet frames in a synchronous network, no function is provided for smoothing a burst traffic of Ethernet frames. In the configuration where Ethernet frames are transmitted over a synchronous network, as an example of a technique for smoothing a burst traffic, it is envisaged to realize a traffic shaper by using QOS function provided on a L2 transmission apparatus, L2 switch or L3 switch provided in a Wide Area Ethernet configuration. However, there is a problem that, since QOS function requires queuing of Ethernet frames, circuit configuration or processing of the Ethernet frame transmission apparatus may become complicated.

Figure 1:
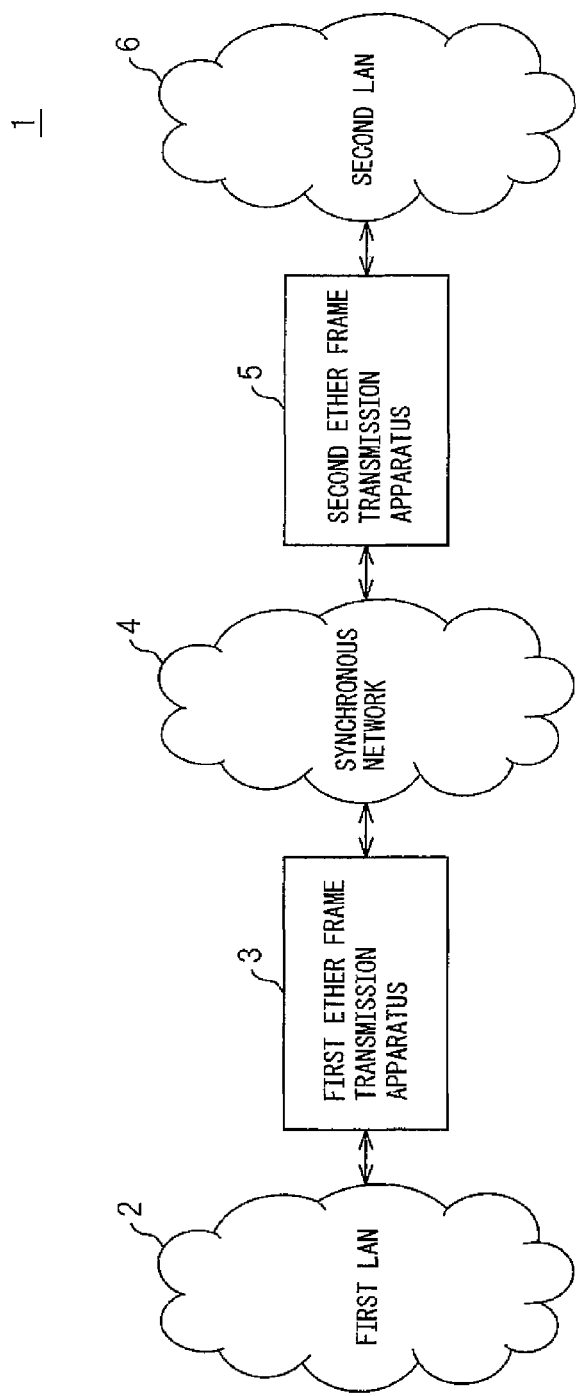
FIG. 1 is a schematic view illustrating the configuration of a network according to an embodiment.

A preferred embodiment will be described below with reference to appended drawings. FIG. 1 is a schematic view illustrating the configuration of a network according to the embodiment. Reference numeral 1 denotes a network, reference numeral 2 denotes a first local area network, reference numeral 3 denotes a first Ethernet frame transmission apparatus, reference numeral 4 denotes a synchronous network, reference numeral 5 denotes a second Ethernet frame transmission apparatus, and reference numeral 6 denotes a second local area network. In the description and drawings that follow, "local area network" is abbreviated as "LAN". Although, for convenience of illustration, a network on the access system side or the lower side network of WAN is referred to herein as a LAN, and is denoted by reference numeral as a first LAN 2 or a Second LAN 6, such a network is not limited to a LAN (local area network). It may be any network dealing with Ethernet frame, or it may be a WAN.

The network 1 includes the first LAN 2, the second LAN 6, the synchronous network 4 connecting the first LAN 2 and the second LAN 6, the first Ethernet frame transmission apparatus 3 and the second Ethernet frame transmission apparatus 5.

The first LAN 2 and the second LAN 6 are Ethernet networks which transmit Ethernet frames. On the other hand, the synchronous network 4 is a network which transmits a signal on a plurality of time division multiplexed channels. The synchronous network 4 may be, for example, a SONET/SDH synchronous network.

The first Ethernet frame transmission apparatus 3 and the second Ethernet frame transmission apparatus 5 map Ethernet frames that flow over Ethernet network such as the first LAN 2 and the second LAN 6 into synchronous frames to be transmitted on the synchronous network 4 and transmit them to the synchronous network 4. Also, the first Ethernet frame transmission apparatus 3 and the second Ethernet frame transmission apparatus 5 demap synchronous frames flowing over the synchronous network 4 to extract Ethernet frames, and transmit them to the first LAN 2 and the second LAN 6, respectively.

When the synchronous network 4 is a SONET/SDH synchronous network, the configuration for transmitting Ethernet frames over the synchronous network 4 may be, for example, POS (PPP over SONET/SDH), EOS (Ethernet over SONET/SDH), or GFP over SONET/SDH). Also, when the synchronous network 4 is a SONET/SDH synchronous network, the first Ethernet frame transmission apparatus 3 and the second Ethernet frame transmission apparatus 5 may be a P-P (point to point) type Ethernet frame transmission apparatus. A P-P type Ethernet frame transmission apparatus mainly performs interface processing between Ethernet and the synchronous network 4, and does not process queuing or path determination. Therefore, by omitting a network processor which carries out relatively elaborate processing such as queue management or policy management, or a L2 switch, it is possible to construct a P-P type Ethernet frame transmission apparatus at low cost.

In the description that follows, the case where Ethernet frames are transmitted from the first Ethernet frame transmission apparatus 3 to the second Ethernet frame transmission apparatus 5 is illustrated. Thus, in the following description, illustration of the configuration and processing used in the case where Ethernet frames are transmitted from the second Ethernet frame transmission apparatus 5 to the first Ethernet frame transmission apparatus 3 is omitted. The first Ethernet frame transmission apparatus 3 and the second Ethernet frame transmission apparatus 5 may include the configuration used in the case where Ethernet frames are transmitted from the second Ethernet frame transmission apparatus 5 to the first Ethernet frame transmission apparatus 3.

Figure 2:
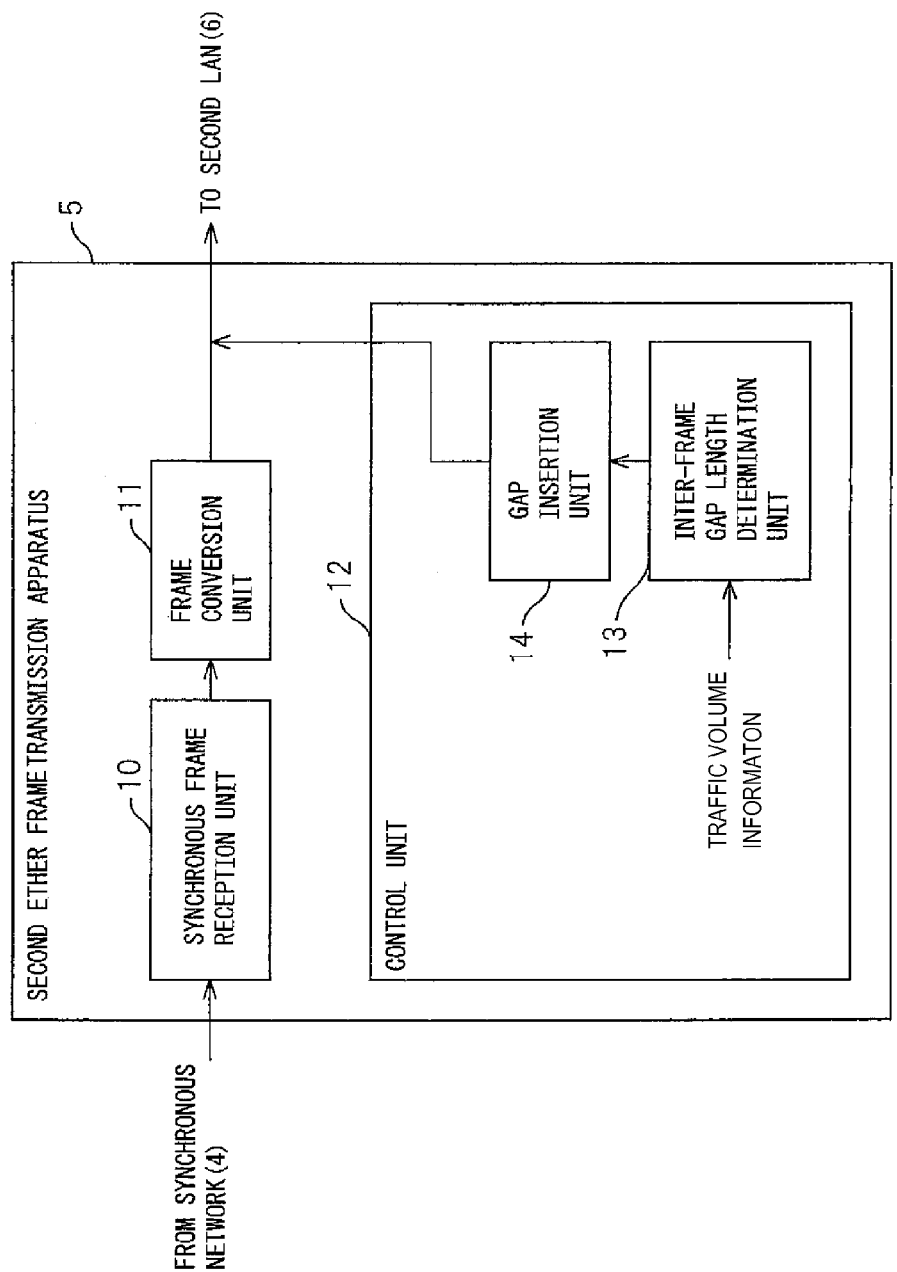
FIG. 2 is a schematic view illustrating the configuration of a first example of Ethernet frame transmission apparatus according to the embodiment.

FIG. 2 is a schematic view illustrating the configuration of a first example of an Ethernet frame transmission apparatus according to an embodiment. FIG. 2 depicts the configuration used in the case where Ethernet frames are received by the second Ethernet frame transmission apparatus 5. Reference numeral 10 denotes a synchronous frame reception unit, reference numeral 11 denotes a frame conversion unit, reference numeral 12 denotes a control unit, reference numeral 13 denotes an inter-frame gap length determination unit, and reference numeral 14 denotes a gap insertion unit. Synchronous frame reception unit 10, frame conversion unit 11, control unit 12, inter-frame gap length determination unit 13 and gap insertion unit 14 may also be referred to as synchronous frame receiver 10, frame converter 11, controller 12, inter-frame gap length determiner 13 and gap inserter 14, respectively.

The second Ethernet frame transmission apparatus 5 includes the synchronous frame reception unit 10, the frame conversion unit 11, and includes the control unit 12. The synchronous frame reception unit 10 receives synchronous frames which are transmitted in time division multiplexed channels over the synchronous network 4. When the synchronous network 4 is SONET/SDH synchronous network, the synchronous frames may be, for example, SONET/SDH frames.

The frame conversion unit 11 converts the synchronous frames received by the synchronous frames reception unit 10 into Ethernet frames. The Ethernet frames converted from the synchronous frames by the frame conversion unit 11 are outputted to the second LAN 6. The control unit 12 adjusts the traffic volume of the Ethernet frames outputted to the second LAN 6 by adjusting the length of inter-frame gap (IFG) to be inserted between Ethernet frames converted by the frame conversion unit 11. That is, the control unit 12 adjusts the length of IFG to thereby shape traffic volume to be outputted to the second LAN 6. The control unit 12 can be mentioned as an example of the inter-frame gap controller.

For this purpose, the control unit 12 includes the inter-frame gap length determination unit 13, and the gap insertion unit 14. A part or all of the processing performed by the inter-frame gap length determination unit 13 and the gap insertion unit 14 may be executed by a programmable LSI such as FPGA. Also, a part or all of the inter-frame gap length determination unit 13 and the gap insertion unit 14 may be realized by dedicated hardware circuits. The control unit 12 may further include a processor and a memory that stores the operation program. A part or all of the processing performed by the inter-frame gap length determination unit 13 and the gap insertion unit 14 may be performed by the processor that executes the operation program.

The control unit 12 may also be provided as a circuit board having a plurality of functional elements mounted on a substrate for an electric circuit, or as a unit including such circuit board, or may be provided as an integrated circuit configuration. This also applies to examples that follow.

The inter-frame gap length determination unit 13 receives traffic volume information relating to Ethernet traffic volume of the Ethernet frames received via synchronous frames from the synchronous network 4. The inter-frame gap length determination unit 13 determines the length of IFG based on the received traffic volume information. The gap insertion unit 14 inserts IFG of the length determined by the inter-frame gap length determination unit 13 between Ethernet frames converted by the frame conversion unit 11.

In accordance with the present embodiment, it is possible to adjust traffic volume of Ethernet frames in the Ethernet frame transmission apparatus that transmits Ethernet frames from the synchronous network 4 to the second LAN 6. Therefore, it is possible to smooth burst traffic of Ethernet frames in the Ethernet frame transmission apparatus that transmits Ethernet frames from the synchronous network 4 to the second LAN 6. As a result, packet loss in the second LAN 6 is reduced, and occurrence of retry processing in the higher layer session is reduced, so that the throughput of the entire network is improved.

Since burst traffic in the second LAN 6 is reduced, hardware and control logic circuits and control processing used for absorbing the burst traffic can also be reduced. As a result, overall cost for the entire network can be reduced.

Figure 3:
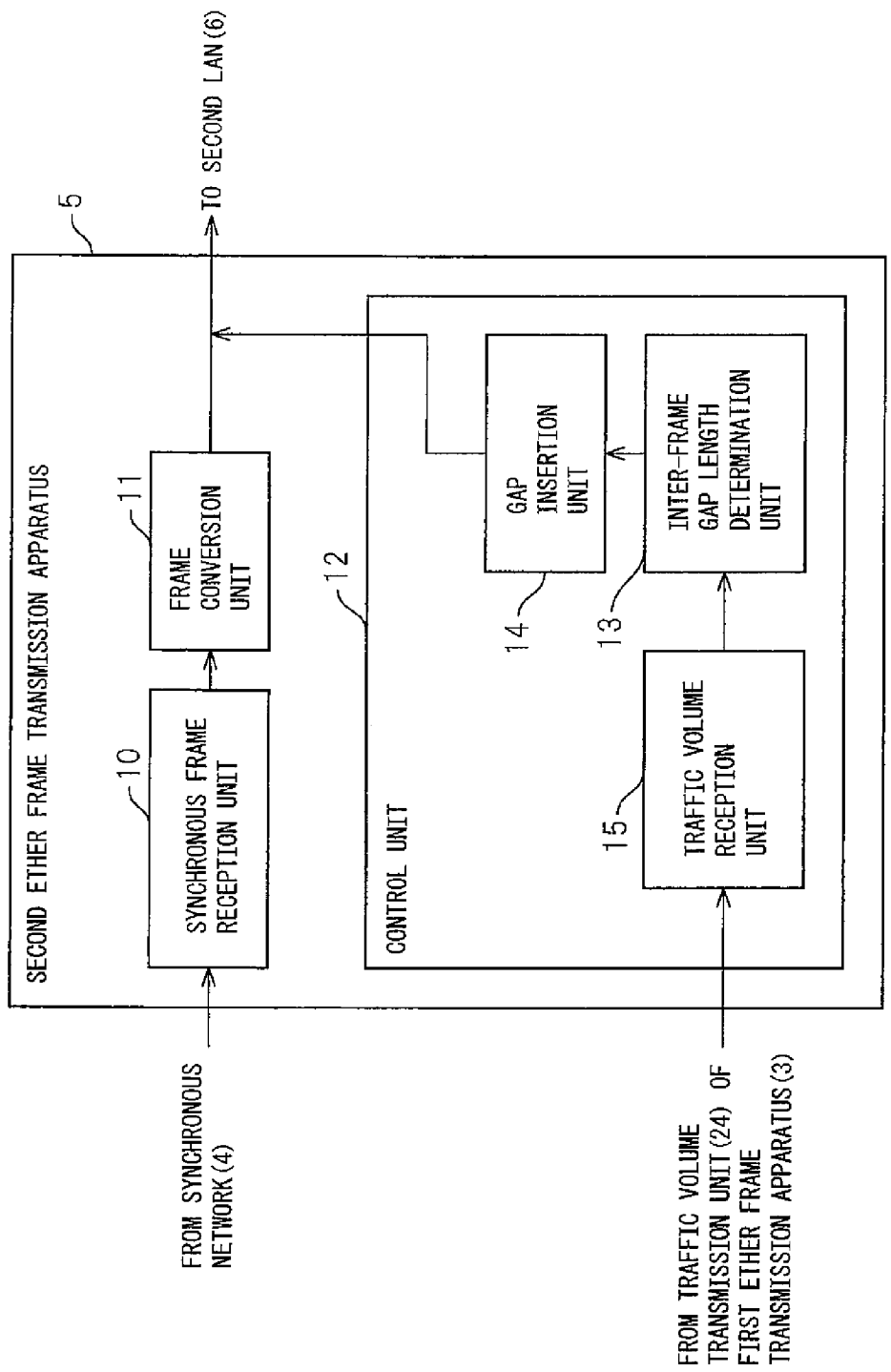
FIG. 3 is a schematic view illustrating the configuration of a second example of Ethernet frame transmission apparatus according to the embodiment.
Figure 4:
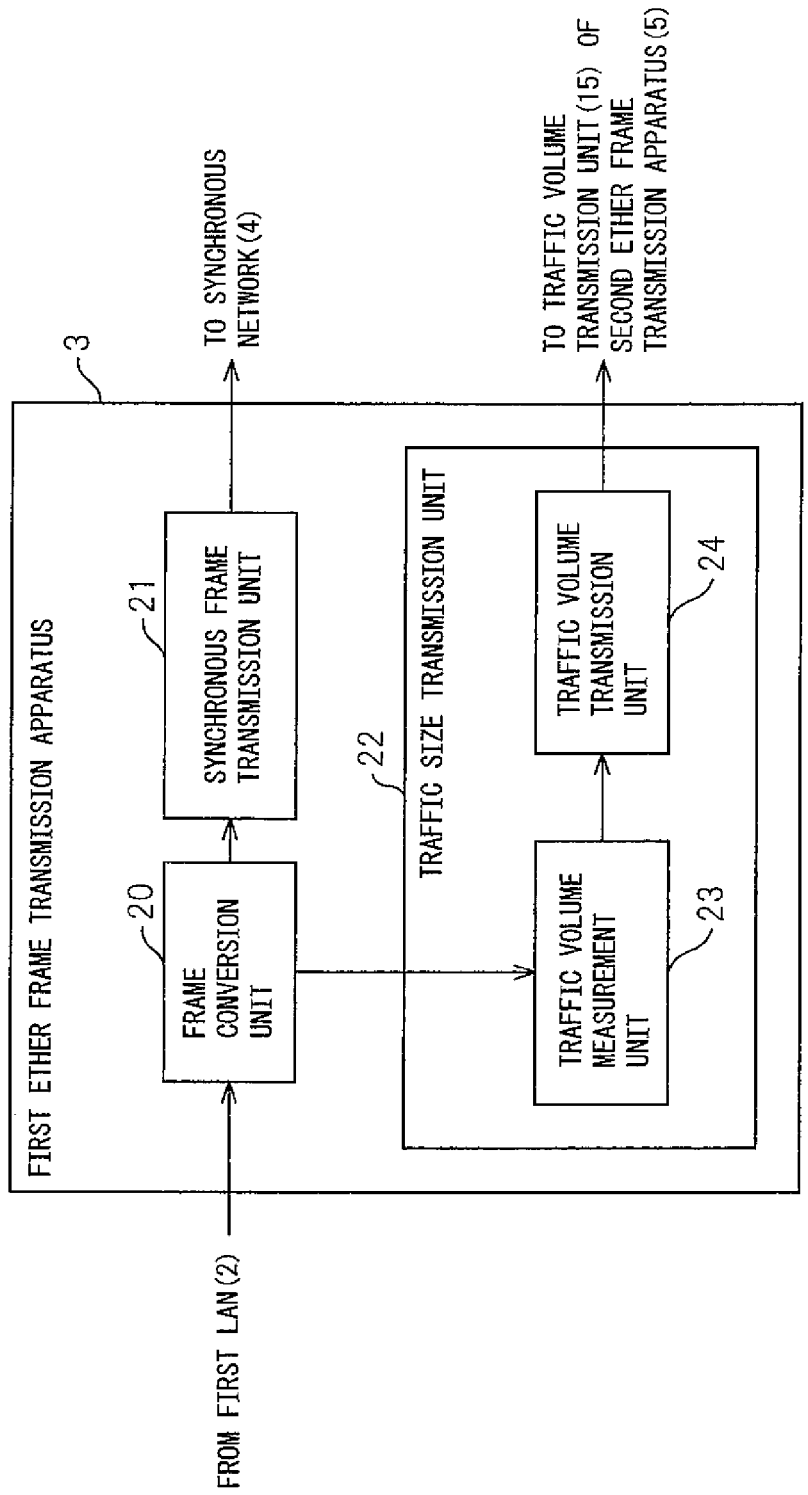
FIG. 4 is a schematic view illustrating the configuration of a third example of Ethernet frame transmission apparatus according to the embodiment.

FIG. 3 and FIG. 4 are schematic views respectively illustrating the configuration of a second and a third example of the Ethernet frame transmission apparatus according to the embodiment. FIG. 3 illustrates the configuration used in the case where Ethernet frames are received by the second Ethernet frame transmission apparatus 5. The second Ethernet frame transmission apparatus 5 has the same configuration as the configuration illustrated in FIG. 2, and constituents similar to the constituents in FIG. 2 are denoted by same reference numerals as used in FIG. 2. Reference numeral 15 denotes a traffic volume reception unit. Traffic volume reception unit 15 may also be referred to as traffic volume receiver 15.

FIG. 4 illustrates the configuration used in the case where Ethernet frames are transmitted by the first Ethernet frame transmission apparatus 3. Reference numeral 20 denotes a frame conversion unit, reference numeral 21 denotes a synchronous frame transmission unit, reference numeral 22 denotes a traffic volume transmission unit, reference numeral 23 denotes a traffic volume measurement unit, and reference numeral 24 denotes a traffic volume transmission unit. Frame conversion unit 20, synchronous frame transmission unit 21, traffic volume transmission unit 22, traffic volume measurement unit 23 and traffic volume transmission unit 24 may also be referred to as Frame converter 20, synchronous frame transmitter 21, traffic volume transmitter 22, traffic volume measurer 23 and traffic volume transmitter 24, respectively.

The first Ethernet frame transmission apparatus 3 includes the frame conversion unit 20, the synchronous frame transmission unit 21, and the traffic volume transmission unit 22. The frame conversion unit 20 converts Ethernet frames received from the first LAN 2 into synchronous frames to be transmitted over the synchronous network 4. The synchronous frame transmission unit 21 transmits the synchronous frames converted by the frame conversion unit 20 to the second Ethernet frame transmission apparatus 5 via the synchronous network 4.

The traffic volume transmission unit 22 transmits the value of traffic volume of Ethernet frames transmitted to the second Ethernet frame transmission apparatus 5 via the synchronous network 4 to the traffic volume reception unit 15 of the second Ethernet frame transmission apparatus 5. For this purpose, the traffic volume transmission unit 22 includes the traffic volume measurement unit 23 and the traffic volume transmission unit 24.

A part or all of the processing to be performed by the traffic volume measurement unit 23 and the traffic volume transmission unit 24 may be executed by a programmable LSI such as FPGA. Also, a part or all of the traffic volume measurement unit 23 and the traffic volume transmission unit 24 may be realized by a dedicated hardware circuit. The traffic volume transmission unit 22 may include a processor and a memory for storing its operation program. A part or all of the processing of the traffic volume measurement unit 23 and the traffic volume transmission unit 24 may be carried out by the processor executing the operation program.

The traffic volume transmission unit 22 may be provided in the form of a circuit board having a plurality of functional elements mounted on a substrate for electric circuit, or a unit including such circuit board, or may be provided in the form of an integrated circuit. When the first Ethernet frame transmission apparatus 3 has the same control unit 12 used in receiving Ethernet frames as the second Ethernet frame transmission apparatus 5, the traffic transmission unit 22 and the control unit 12 may be provided as one unit.

The traffic volume measurement unit 23 measures the value of traffic volume of Ethernet frames transmitted to the second Ethernet frame transmission apparatus 5 via the synchronous network 4. Measurement method adopted by the traffic volume measurement unit 23 may be same as the method described later with reference to FIG. 8 to FIG. 10.

The traffic volume transmission unit 24 transmits the measurement value measured by the traffic volume measurement unit 23 to the traffic volume reception unit 15 of the second Ethernet frame transmission apparatus 5. The traffic volume transmission unit 24 may transmit the measurement value to the traffic volume reception unit 15 of the second Ethernet frame transmission apparatus 5 via the synchronous network 4. The traffic volume transmission unit 24 may transmit the measurement value to the second Ethernet frame transmission apparatus 5, for example, by storing the measurement value in the overhead of the synchronous frame transmitted by the synchronous frame transmission unit 21. The traffic volume transmission unit 24 may also transmit the measurement value to the second Ethernet frame transmission apparatus 5, for example, by storing the measurement value in the payload of the synchronous frame transmitted by the synchronous frame transmission unit 21.

Also, the traffic volume transmission unit 24 may store the measurement value in the control frame used in specified communication procedure implemented on the synchronous network 4. Examples of such communication procedure include Generic Framing Procedure (GFP) implemented on SONET/SDH network. Measurement value may be transmitted, for example, by storing it in Client Management Frame (CMF) transmitted in GFP frame.

Referring to FIG. 3, the control unit 12 of the second Ethernet frame transmission apparatus 5 includes the traffic volume reception unit 15. A part or all of processing performed by the traffic volume reception unit 15 may be carried out by a programmable LSI such as FPGA. Also, a part or all of the traffic volume reception unit 15 may be realized as a dedicated hardware circuit. Further, when the control unit 12 includes a processor and a memory storing its operation program, a part or all of the processing performed by the traffic volume reception unit 15 may be carried out by the processor executing its operation program.

The traffic volume reception unit 15 receives the measurement value transmitted from the traffic volume transmitting unit 24 of the first Ethernet frame transmission apparatus 3. The inter-frame gap length determination unit 13 determines the length of IFG based on the measurement value received by the traffic volume reception unit 15.

In accordance with the present embodiment, it is possible to measure traffic volume of Ethernet frames in the first Ethernet frame transmission apparatus 3 on the transmission side transmitting Ethernet frames to the synchronous network 4. Therefore, the second Ethernet frame transmission apparatus 5 on the reception side needs not measure traffic volume of Ethernet frames.

Advantageous effect obtained by eliminating the need to measure traffic volume in the second Ethernet frame transmission apparatus 5 on the reception side will be described below. Suppose that traffic volume of Ethernet frames needs to be measured in the second Ethernet frame transmission apparatus 5. It is easier to measure traffic volume of an Ethernet frame in a state not mapped to synchronous frames than to measure traffic volume of an Ethernet frame in a state mapped to synchronous frames. Therefore, if traffic volume of Ethernet frames is to be measured in the second Ethernet frame transmission apparatus 5, it is preferable to measure it in a state not mapped to synchronous frames.

In measuring traffic volume, an accumulated value of traffic volume over a measurement period is measured. Therefore, in order to adjust IFG of Ethernet frames for this measurement period based on measurement value accumulated over this measurement period, a buffer is required which is able to retain the Ethernet frames for certain period. Thus, if traffic volume of Ethernet frames is to be measured in a non-mapped state in the second Ethernet frame transmission apparatus 5, a buffer is required to retain Ethernet frames for the necessary period after extracting them from synchronous frames.

In accordance with the present embodiment, since traffic volume is measured in the first Ethernet frame transmission apparatus 3, a buffer for retaining Ethernet frames in order to measure traffic volume needs not be provided in the second Ethernet frame transmission apparatus 5.

Figure 5:
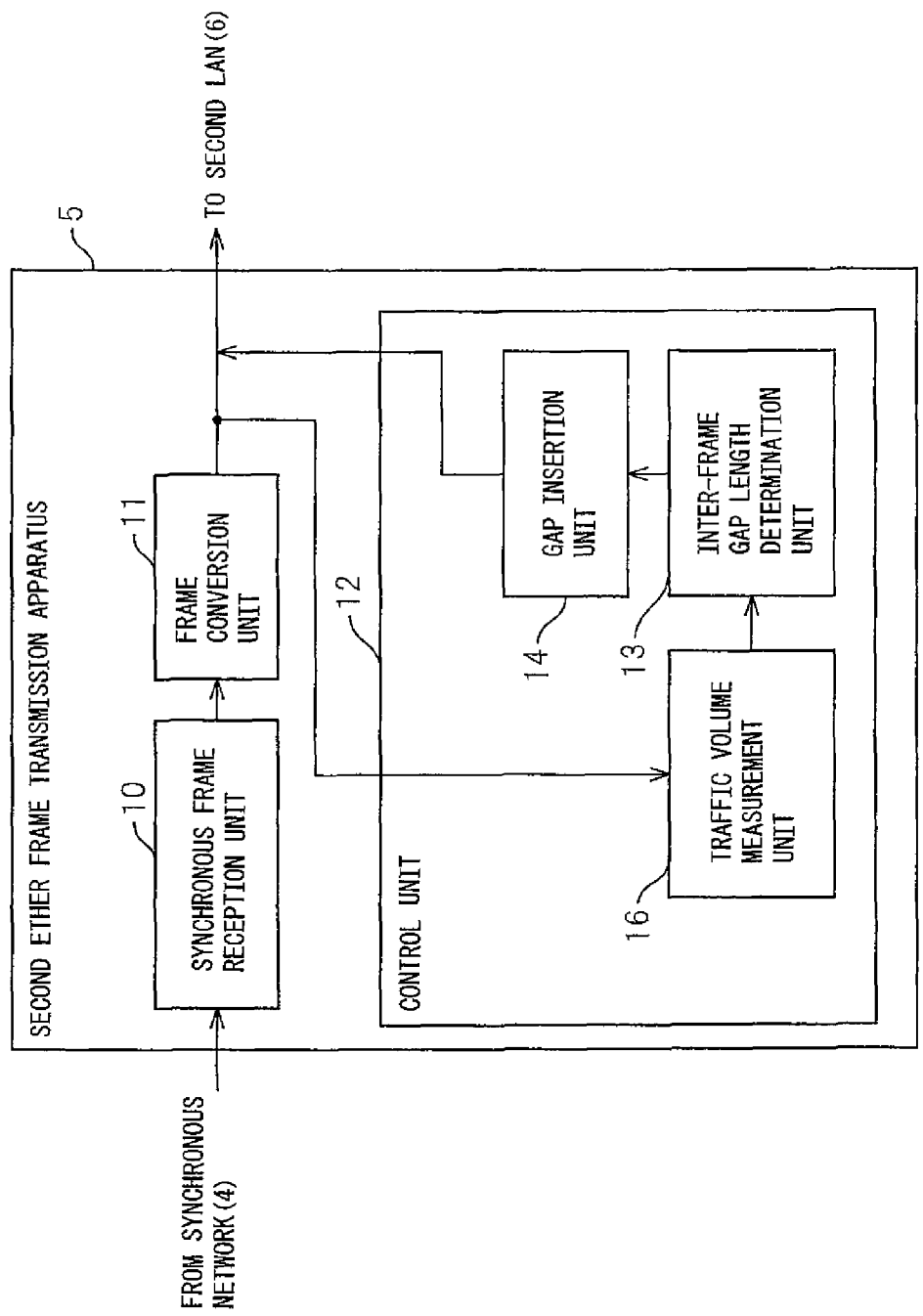
FIG. 5 is a schematic view illustrating the configuration of a fourth example of Ethernet frame transmission apparatus according to the embodiment.

FIG. 5 is a schematic view illustrating the configuration of a fourth example of the Ethernet frame transmission apparatus according to the embodiment. FIG. 5 depicts the configuration used in a case where Ethernet frames are received in the second Ethernet frame transmission apparatus 5. The second Ethernet frame transmission apparatus 5 depicted in FIG. 5 has the same configuration as the configuration depicted in FIG. 2, and constituents similar to the constituents depicted in FIG. 2 are denoted by same reference numerals as the reference numerals used in FIG. 2. Reference numeral 16 denotes a traffic volume measurement unit. Traffic volume measurement unit 16 may also be referred to as traffic volume measurer 16.

The control unit 12 includes the traffic volume measurement unit 16. A part or all of processing performed by the traffic volume measurement unit 16 may be carried out by a programmable LSI such as FPGA. Also, a part or all of the traffic volume measurement unit 16 may be realized as a dedicated hardware circuit. Further, when the control unit 12 includes a processor and a memory storing its operation program, a part or all of the processing performed by the traffic volume measurement unit 16 may be carried out by the processor executing its operation program.

The traffic volume measurement unit 16 measures the value of traffic volume of Ethernet frame outputted from the frame conversion unit 11. Measurement method adopted in the traffic volume measurement unit 16 may be the same method as the method to be described later with reference to FIG. 8 and FIG. 9. The inter-frame gap length determination unit 13 determines the length of IFG based on the measurement value measured by the traffic volume measurement unit 16.

In accordance with the present embodiment, it is possible to measure traffic volume of Ethernet frames in the second Ethernet frame transmission apparatus 5 on the reception side receiving Ethernet frames from the synchronous network 4. Therefore, the first Ethernet frame transmission apparatus 3 on the transmission side needs not measure traffic volume nor does it need to transmit traffic volume measured in the first Ethernet frame transmission apparatus 3.

Figure 6:
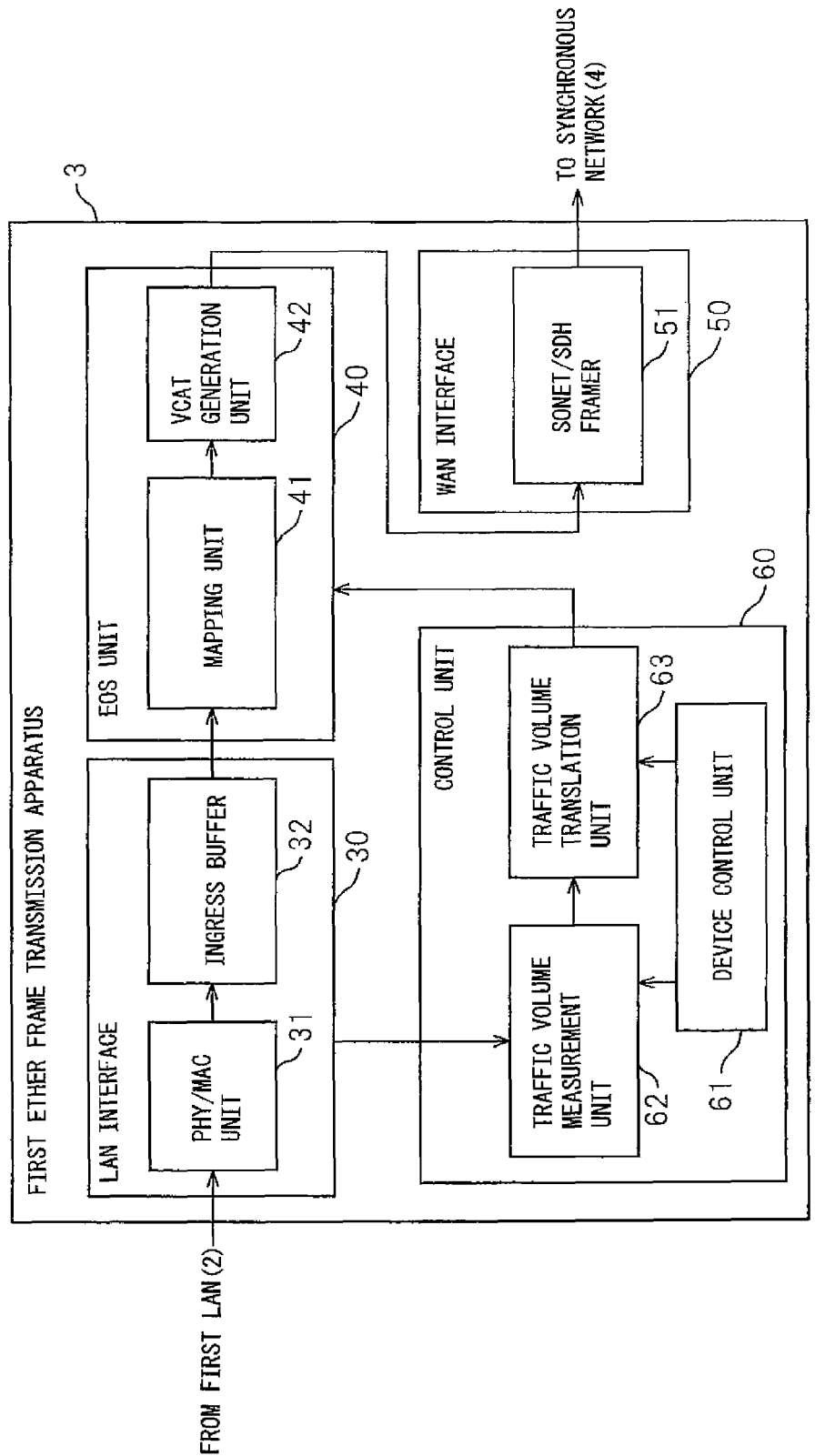
FIG. 6 is a schematic view illustrating the configuration of a fifth example of Ethernet frame transmission apparatus according to the embodiment.
Figure 7:
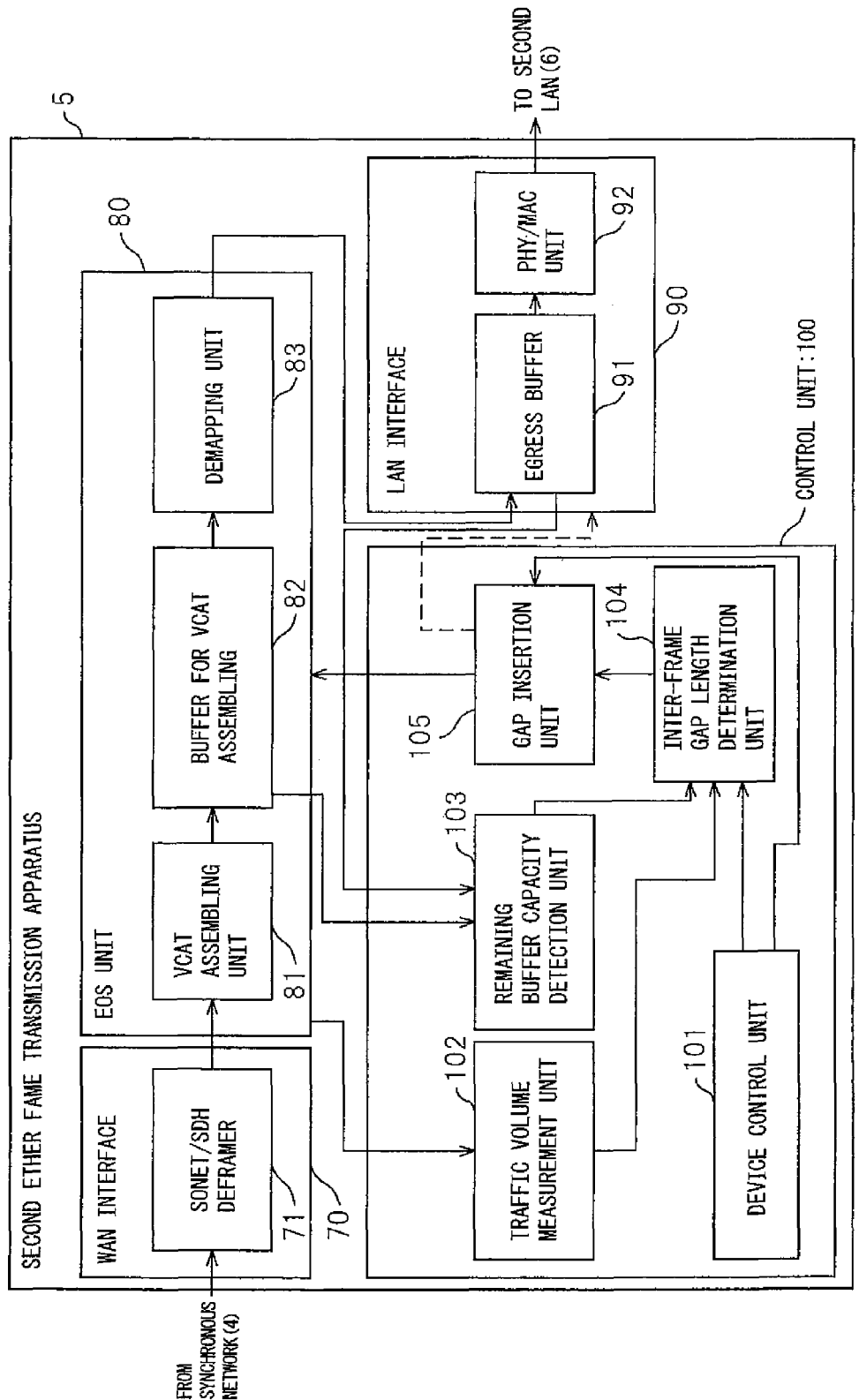
FIG. 7 is a schematic view illustrating the configuration of a sixth example of Ethernet frame transmission apparatus according to the embodiment.

FIG. 6 and FIG. 7 are schematic views illustrating the configuration of fifth and sixth examples of Ethernet frame transmission apparatus according to the embodiment. FIG. 6 illustrates the configuration used in the case where Ethernet frames are transmitted in the first Ethernet frame transmission apparatus 3. Reference numeral 30 denotes a LAN interface, reference numeral 31 denotes a PHY/MAC unit, reference numeral 32 denotes an ingress buffer, reference numeral 40 denotes an EOS unit, reference numeral 41 denotes a mapping unit, and reference numeral 42 denotes a VCAT generating unit. PHY/MAC unit 31, EOS unit 40, mapping unit 41, and VCAT generating unit 42 may also be referred to as PHY/MAC circuit 31, EOS circuit 40, mapper 41, and VCAT generator 42, respectively.

Reference numeral 50 denotes a WAN interface, reference numeral 51 denotes a SONET/SDH framer, reference numeral 60 denotes a control unit, reference numeral 61 denotes a device control unit, reference numeral 62 denotes a traffic volume measurement unit, and reference numeral 63 denotes a traffic volume transmission unit. Control unit 60, device control unit 61, traffic volume measurement unit 62 and traffic volume transmission unit 63 may also be referred to as controller 60, device controller 61, traffic volume measurer 62 and traffic volume transmitter 63, respectively.

FIG. 7 illustrates the configuration used in the case where Ethernet frames are received in the second Ethernet frame transmission apparatus 5. Reference numeral 70 denotes a WAN interface, reference numeral 71 denotes a SONET/SDH deframer, reference numeral 80 denotes an EOS unit, reference numeral 81 denotes a VCAT assembling unit, reference numeral 82 denotes a buffer for VCAT assembling, and reference numeral 83 denotes a demapping unit. EOS unit 80, VCAT assembling unit 81 and demapping unit 83 may also be referred to as EOS circuit 80, VCAT assembler 81 and demapper 83, respectively.

Reference numeral 90 denotes a LAN interface, reference numeral 91 denotes an egress buffer, reference numeral 92 denotes a PHY/MAC unit, reference numeral 100 denotes a control unit, reference numeral 101 denotes a device control unit, reference numeral 102 denotes a traffic volume reception unit, reference numeral 103 denotes a remaining buffer capacity detection unit, reference numeral 104 denotes an inter-frame gap length determination unit, and reference numeral 105 denotes a gap insertion unit. PHY/MAC unit 92, control unit 100, device control unit 101, traffic volume reception unit 102, remaining buffer capacity detection unit 103, inter-frame gap length determination unit 104 and gap insertion unit 105 may also be referred to as PHY/MAC circuit 92, controller 100, device controller 101, traffic volume receiver 102, remaining buffer capacity detector 103, inter-frame gap length determiner 104 and gap inserter 105, respectively.

The first Ethernet frame transmission apparatus 3 and the second Ethernet frame transmission apparatus 5 depicted respectively in FIG. 6 and FIG. 7 are Ethernet frame transmission apparatuses that transmit Ethernet frames via SONET/SDH synchronous network as the synchronous network 4. The first Ethernet frame transmission apparatus 3 and the second Ethernet frame transmission apparatus 5 may be, for example, P-P type Ethernet frame transmission apparatuses.

Referring to FIG. 6, the first Ethernet frame transmission apparatus 3 includes the LAN interface 30, EOS unit 40, WAN interface 50, and the control unit 60. LAN interface 30 executes interface processing for receiving Ethernet frames from the first LAN 2 in the first Ethernet frame transmission apparatus 3. LAN interface 30 includes PHY/MAC unit 31 for processing in physical layer and MAC layer for receiving Ethernet frames, and the ingress buffer 32 for temporarily storing inputted frames.

EOS unit 40 maps Ethernet frames received in the LAN interface 30 to SONET/SDH frames. EOS unit 40 may be mentioned as an example of a converter for converting Ethernet frames to synchronous frames. EOS unit 40 includes a mapping unit 41 and VCAT generating unit 42.

The mapping unit 41 maps Ethernet frames to frames used in a predetermined procedure or in a predetermined protocol executed in SONET/SDH synchronous network 4. The predetermined procedure may be, for example, Generic framing procedure (GFP). The predetermined protocol may be, for example, Point to Point Protocol (PPP). In the description that follows, the frames used in the predetermined procedure or predetermined protocol for mapping of Ethernet frames by the mapping unit 41 may be referred to as "intermediate frames". VCAT generating unit 42 maps the intermediate frames to virtual path on SONET/SDH synchronous network 4.

WAN interface 50 forms a path and a section for transmitting SONET/SDH frames via SONET/SDH synchronous network 4. WAN interface 50 includes SONET/SDH framer 51 which, after imparting overhead to frames mapped by VCAT generating unit 42, converts an electrical signal into an optical signal.

The control unit 60 transmits, traffic volume reception unit 102 of the second Ethernet frame transmission apparatus 5, traffic volume information indicating the value of traffic volume of Ethernet frames transmitted to the second Ethernet frame transmission apparatus 5 via SONET/SDH synchronous network 4. The control unit 60 includes a device control unit 61, a traffic volume measurement unit 62, and a traffic volume transmission unit 63. The control unit 60 may be mentioned as an example of the traffic volume transmitter.

A part or all of processing performed by the traffic volume measurement unit 62 and the traffic volume transmission unit 63 may be carried out by a programmable LSI such as FPGA. Also, a part or all of the traffic volume measurement unit 62 and the traffic volume transmission unit 63 may be realized by a dedicated hardware circuit. The control unit 60 may include a processor and a memory for storing its operation program. A part or all of processing performed by the traffic volume measurement unit 62 and the traffic volume transmission unit 63 may be carried out by the processor executing the operation program. The control unit 60 may be provided in the form of a circuit board having a plurality of functional elements mounted on a substrate for electric circuit or in the form of a unit including such circuit board, or may be provided in the form of an integrated circuit.

Figure 8:
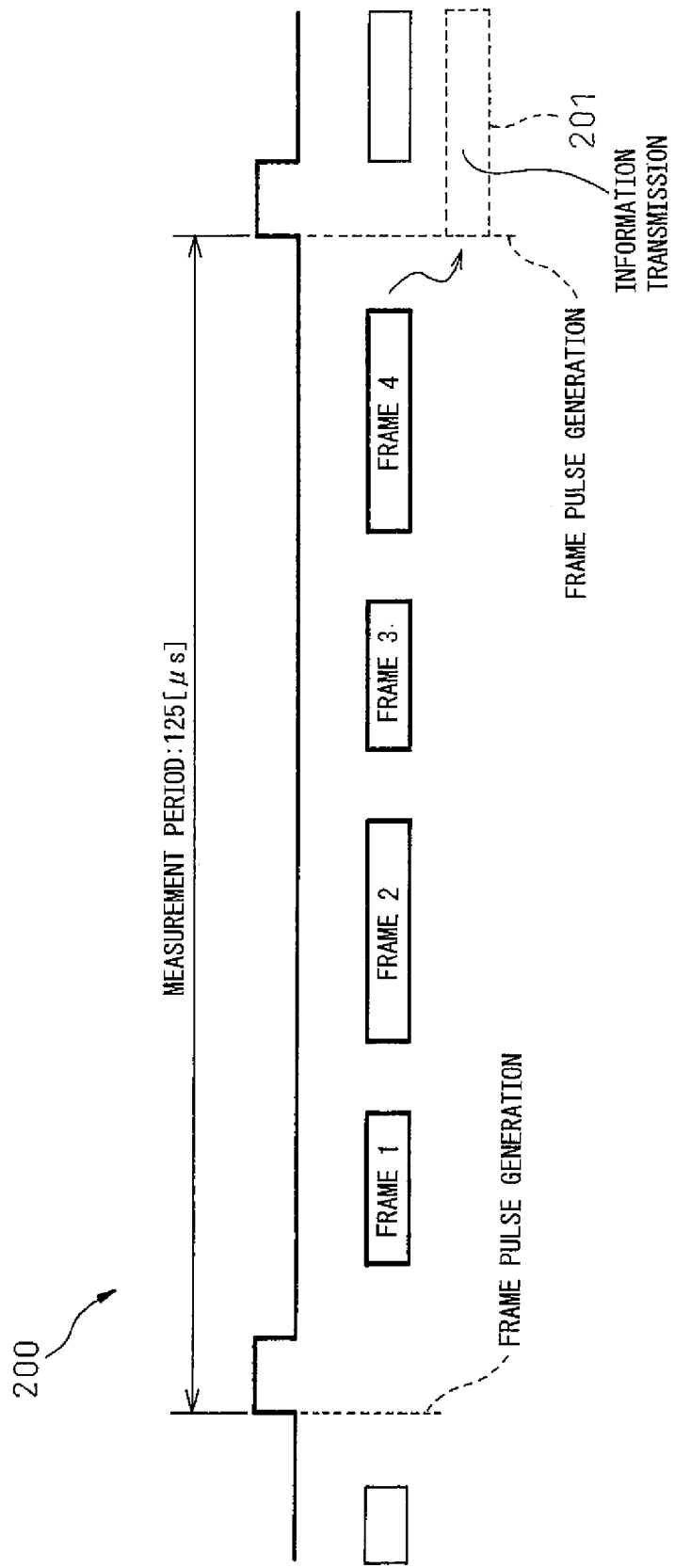
FIG. 8 is a view illustrating a first example of the measurement method for measuring the traffic volume.

The traffic volume measurement unit 62 measures the value of traffic volume of Ethernet frames transmitted to the second Ethernet frame transmission apparatus 5 via the synchronous network 4. FIG. 8 is a view illustrating an example of the method for measuring traffic volume. The traffic volume measurement unit 62 measures the number of frames received in the first Ethernet frame transmission apparatus 3 in a predetermined measurement period to be transmitted to the second Ethernet frame transmission apparatus 5 as the value indicating traffic volume of Ethernet frames. In FIG. 8 and in FIG. 9 to be described later, reference numeral 200 denotes the predetermined measurement period.

Length t of the predetermined measurement period is preferably the shortest length that allows a sufficient number of frames for use as an indicator of traffic volume to be counted. For example, the value of length t of the measurement period may be a multiple of the period 125 μsec for generation of frame pulse in SONET/SDH synchronous network 4. In SONET/SDH synchronous network 4, frames are transmitted with the generation timing of frame pulse as basis. By adopting the length of the measurement period as described above, measured value of traffic volume measured in the transmission period of preceding SONET/SDH frame can be transmitted during transmission of the next SONET/SDH frame, and transmission delay of the measured value of traffic volume can be minimized. The traffic volume measurement unit 62 may be configured such that the length t of measurement period can be set by the device control unit 61.

In FIG. 8 and in FIG. 9 to be described later, reference numeral 201 denotes traffic volume information indicating the measured value of traffic volume of Ethernet frames transmitted in SONET/SDH transmission period immediately after the measurement period 200.

Figure 9:
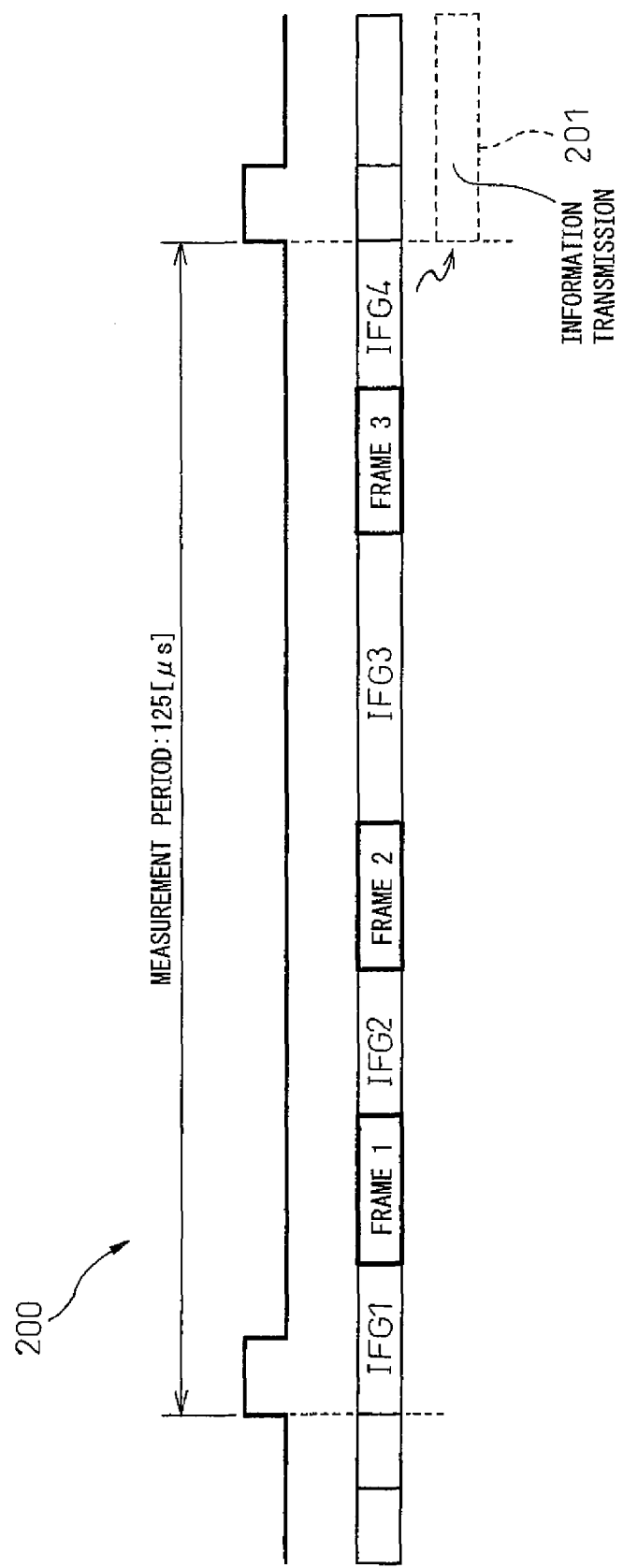
FIG. 9 is a view illustrating a second example of the measurement method for measuring the traffic volume.

FIG. 9 is a view illustrating a second example of the method for measuring traffic volume. The traffic volume measurement unit 62 measures sum of length of Ethernet frames which are received by the first Ethernet frame transmission apparatus 3 in the measurement period 200 and which are to be transmitted to the second Ethernet frame transmission apparatus 5, and sum of length of IFG in the measurement period 200. The traffic volume measurement unit 62 measures the ratio between the sum of length of Ethernet frames and the sum of length of IFG as a value indicating traffic volume of Ethernet frames. Otherwise, the method is the same as the method of FIG. 8.

Figure 10:
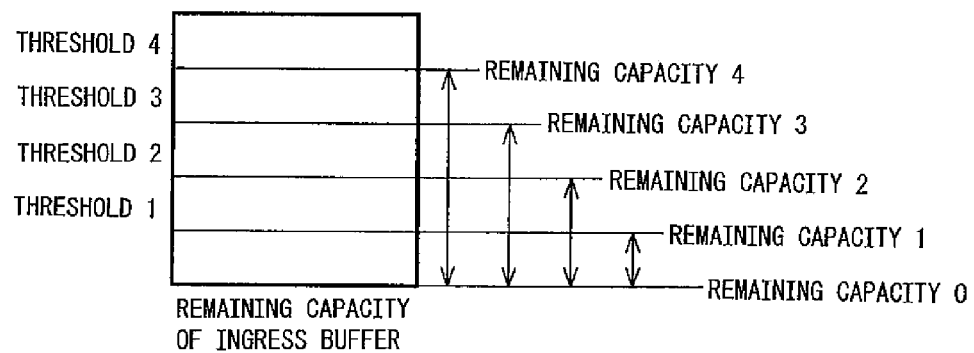
FIG. 10 is a view illustrating a third example of the measurement method for measuring the traffic volume.

FIG. 10 is a view illustrating a third example of the method for measuring traffic volume. The traffic volume measurement unit 62 measures remaining buffer capacity of the ingress buffer 32 as the value indicating traffic volume of Ethernet frames. At this time, the traffic volume measurement unit 62 may express remaining buffer capacity, for example, as one of ordered sequence of predetermined numerical values v1, v2, - - - . The traffic volume measurement unit 62 may select one numerical value vx from the sequence of predetermined numerical values as indicating remaining buffer capacity in accordance with magnitude relation between a plurality of thresholds set in correspondence to respective numerical values v1, v2, - - - and remaining buffer capacity of the ingress buffer 32.

For example, when the remaining buffer capacity is greater than threshold 3 and not greater than threshold 4, the traffic volume measurement unit 62 determines the value indicating remaining buffer capacity to be the remaining capacity "4". When the remaining buffer capacity is greater than threshold 2 and not greater than threshold 3, the traffic volume measurement unit 62 determines the value indicating remaining buffer capacity to be the remaining capacity "3". When the remaining buffer capacity is greater than threshold 1 and not greater than threshold 2, the traffic volume measurement unit 62 determines the value indicating remaining buffer capacity to be the remaining capacity "2". When the remaining buffer capacity is greater than threshold 0 and not greater than threshold 1, the traffic volume measurement unit 62 determines the value indicating remaining buffer capacity to be the remaining capacity "1". When the remaining buffer capacity is 0, the traffic volume measurement unit 62 determines the value indicating remaining buffer capacity to be the remaining capacity "0".

By determining the value indicating remaining buffer capacity, the remaining buffer capacity is expressed by a predetermined numerical value sequence including a plurality of ordered numerical value "4" to "0". The traffic volume measurement unit 63 may be configured such that the thresholds 1 to 4 and remaining buffer capacity 0 to 4 can be set by the device control unit 61.

Also, in the method for measuring traffic buffer size as illustrated in FIG. 8 and FIG. 9, the value indicating traffic volume of Ethernet frames may be expressed by a predetermined ordered numerical value sequence. A plurality of thresholds which are set in correspondence to respective values included in the predetermined numerical value sequence may be compared with measured value, and by mapping the measured value to one of the predetermined numerical value sequence based on magnitude relation between the measured value and the plurality of thresholds, the value indicating traffic volume can be expressed with the predetermined numerical value sequence.

In description of the embodiment that follows, the traffic volume information indicating traffic volume of Ethernet frames expresses traffic volume with an ordered sequence of predetermined numerical values. However, in another embodiment, traffic volume information that expresses traffic volume of Ethernet frames in a form different from the present embodiment may be adopted. The value indicating traffic volume expressed with a sequence of predetermined numerical values may be referred to as "traffic volume ID".

Figure 11A:
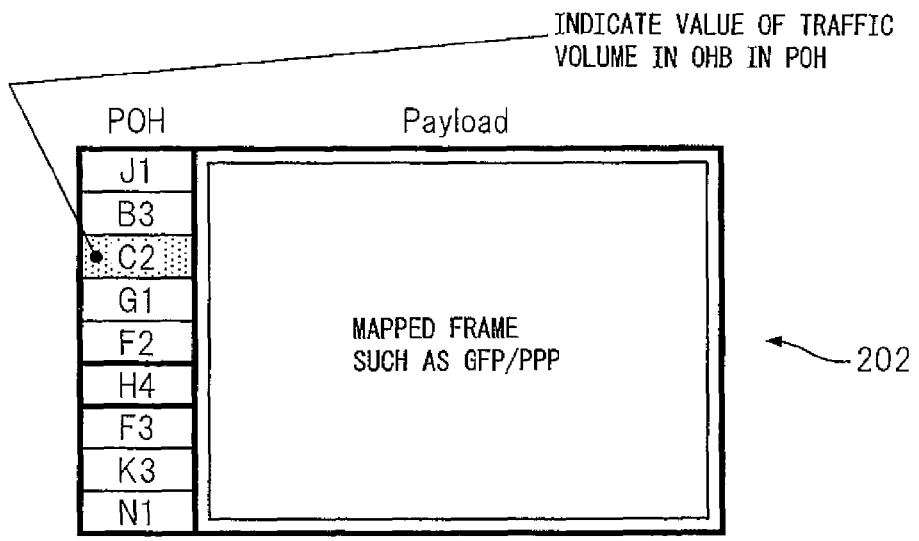
FIG. 11A is a view illustrating a virtual container.

Referring to FIG. 6, the traffic volume transmission unit 63 transmits traffic volume information indicating the traffic volume measured by the traffic volume measurement unit 62 to the traffic volume reception unit 102 of the second Ethernet frame transmission apparatus 5. The traffic volume transmission unit 63 may transmit the traffic volume information to the second Ethernet frame transmission apparatus 5, for example, by mapping the traffic volume information to path overhead (POH) of SONET/SDH frames. FIG. 11A is a view useful for illustrating a virtual container transmitted by SONET/SDH frames. The virtual container 202 has POH and payload portion, wherein POH has overhead bytes (OHB) such as "J1", "B3", "C2", etc. For example, the traffic volume transmission unit 63 may map traffic volume information to OHB other than "C2" bytes.

Figure 11B:
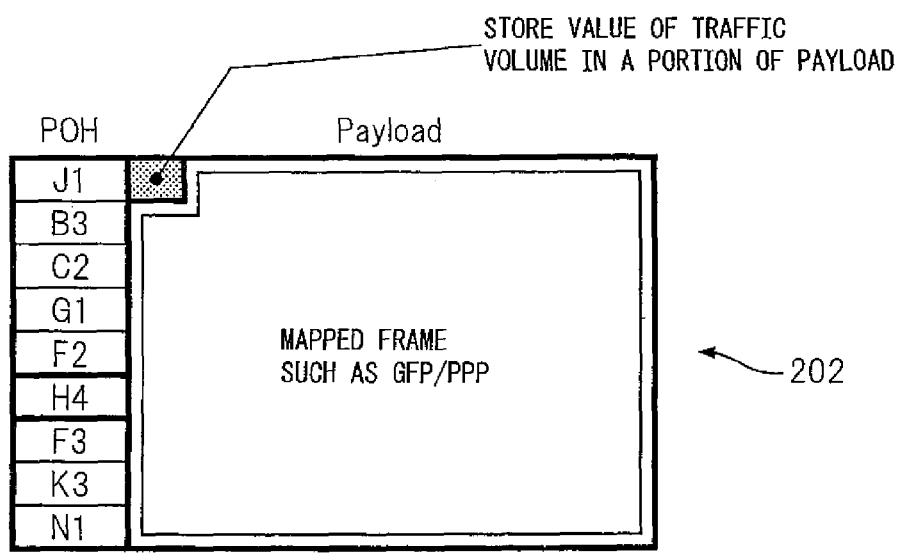
FIG. 11B is a view illustrating a virtual container.

The traffic volume transmission unit 63 may store traffic volume information in payload portion of the virtual container 202 as illustrated in FIG. 11B, and transmit it to the traffic volume reception unit 102. In EOS device transmitting Ethernet frames over SONET/SDH synchronous network, or in POS device transmitting Ethernet frames over SONET/SDH synchronous network to execute PPP, there are cases where specified bytes are used to transmit LAN line breakage information from an ingress side device to an egress side device. In such case, by storing traffic volume information together with LAN line breakage information, the function of transmitting traffic volume information can be easily realized.

Figure 12:
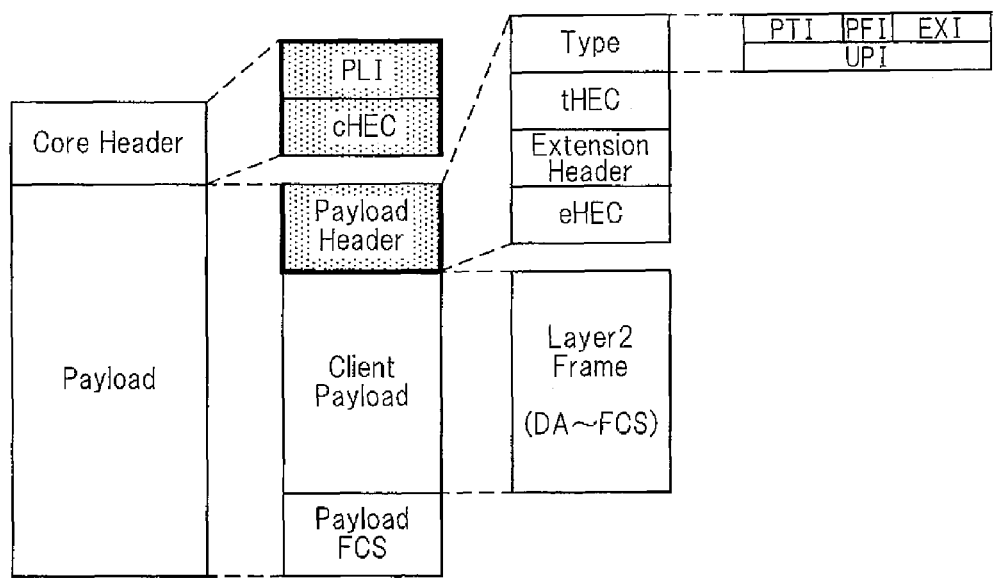
FIG. 12 is a view illustrating a GFP frame.

When the first and the second Ethernet frame transmission apparatuses 3 and 5 implement GFP over SONET/SDH synchronous network, the traffic volume transmission unit 63 may store traffic volume information in CMF transmitted in GFP frames and transmit it to the traffic volume reception unit 102. FIG. 12 is a view useful for illustrating a GFP frame.

A GFP frame includes a Core Header field and a Payload field, and the Core Header field includes PLI and cHEC. PLI indicates the length of the Payload field, and cHEC indicates the result of CRC16 calculation performed on the PLI.

On the other hand, the Payload field includes a Payload Header field, a Client Payload field, and a Payload FCS field. A Layer 2 frame to be transmitted is stored in the Client Payload field, and Payload FCS indicates the result of FCS calculation performed on the Client Payload field.

Payload Header field includes Type field, tHEC field, Extension Header field and eHEC field. Type field indicates type of GFP frame format, and protocol type of higher layer of data stored in Payload field. Type field includes PTI (Payload Type Indicator), PFI (Payload FCS Indicator), EXI (Extension Header Identifier), and UPI (User Payload Identifier).

Value of PTI field indicating CMF is "100". The traffic volume transmission unit 63 may store traffic volume information in Client Payload field of CMF, and transmit it to the traffic reception unit 102.

In order to maintain compatibility with an apparatus having no function of receiving traffic volume information according to the present embodiment, the traffic volume transmission unit 63 may be configured such that the device control unit 61 can decide whether or not traffic volume information is to be transmitted.

Referring to FIG. 7, the second Ethernet frame transmission apparatus 5 includes a WAN interface 70, EOS unit 80, a LAN interface 90, and a control unit 100. WAN interface 70 forms path and section for transmitting SONET/SDH frames via SONET/SDH synchronous network 4. WAN interface 70 includes SONET/SDH deframer 71. SONET/SDH deframer 71, after converting optical signal transmitted over SONET/SDH synchronous network 4 into electrical signal, deletes the overhead added to SONET/SDH frames converted to electrical signal.

EOS unit 80 demaps SONET/SDH frames outputted from WAN interface 70 to Ethernet frames. EOS unit 80 can be mentioned as an example of converter for converting synchronous frames to Ethernet frames. EOS unit 80 includes VCAT assembling unit 81, a buffer for VCAT assembling 82, and a demapping unit 83.

VCAT assembling unit 81 generates original intermediate frames from data mapped to a virtual path on SONET/SDH synchronous network 4. As described above, the intermediate frames may be frames used in GFP or PPP. The buffer for VCAT assembling 82 is a buffer for temporarily retaining frames during processing by VCAT assembling unit 81. The demapping unit 83 demaps Ethernet frames from the intermediate frames.

LAN interface 90 performs interface processing for transmitting Ethernet frames from the second Ethernet frame transmission apparatus 5 to the second LAN 6. LAN interface 90 includes an egress buffer 91 for temporarily storing outputted frames, and PHY/MAC unit 92 for performing the processing in physical layer and MAC layer in transmission of Ethernet frames.

The control unit 100 adjusts length of IFG inserted between Ethernet frames to be outputted from the second Ethernet frame transmission apparatus 5 based on traffic volume information transmitted from the first Ethernet frame transmission apparatus 3. The control unit 100 includes a device control unit 101, a traffic volume reception unit 102, a remaining buffer capacity detection unit 103, an inter-frame gap length determination unit 104, and a gap insertion unit 105. The control unit 100 is an example of the inter-frame gap controller.

A part or all of processing performed by the traffic volume reception unit 102, the remaining buffer capacity detection unit 103, the inter-frame gap length determination unit 104 and the gap insertion unit 105 may be carried out by a programmable LSI such as FPGA. A part or all of the traffic volume reception unit 102, the remaining buffer capacity detection unit 103, the inter-frame gap length determination unit 104 and the gap insertion unit 105 may be realized as a dedicated hardware circuit.

The control unit 100 may include a processor and a memory for storing its operation program. A part or all of processing performed by the traffic volume reception unit 102, the remaining buffer capacity detection unit 103, the inter-frame gap length determination unit 104 and the gap insertion unit 105 may be carried out by the processor executing the operation program.

The control unit 100 may be provided in the form of a circuit board having a plurality of functional elements mounted on a substrate for electric circuit, or a unit including such circuit board, or may be provided in the form of an integrated circuit. This also applies to other embodiments. When the first Ethernet frame transmission apparatus 3 has the same control unit 100 used in receiving Ethernet frames as the second Ethernet frame transmission apparatus 5, the control unit 60 and the control unit 100 may be provided as one unit. In this case, the device control unit 61 and the device control unit 101 may be provided as one unit.

The device control unit 101 determines and changes set values for setting operation of various components of the second Ethernet frame transmission apparatus 5. The traffic volume reception unit 102 receives traffic volume information transmitted from the traffic volume transmission unit 63 of the first Ethernet frame transmission apparatus 3.

The remaining buffer capacity detection unit 103 detects the remaining buffer capacity of the buffer for VCAT assembling 82 and/or the egress buffer 91. In the following description of the embodiment, the remaining buffer capacity of the buffer for VCAT assembling 82 and/or the egress buffer 91 is expressed by a sequence of predetermined numerical values including a plurality of ordered numerical values in the same manner as the method described above with reference to FIG. 10. The remaining buffer capacity expressed by a sequence of the predetermined numerical values including a plurality of ordered numerical values may be sometimes referred to as "remaining buffer capacity ID".

The inter-frame gap length determination unit 104 determines the length of IFG inserted between Ethernet frames outputted from the second Ethernet frame transmission apparatus 5 to the second LAN 6. The inter-frame gap length determination unit 104 may determine the length of IFG based not only on the traffic volume information but also on remaining buffer capacity of the buffer for VCAT assembling 82 and/or egress buffer 91 as additional conditions. In the following embodiment, the inter-frame gap length determination unit 104 determines the length of IFG based on traffic volume information, and on remaining buffer capacity of the buffer for VCAT assembling 82 and/or the egress buffer 91.

The gap insertion unit 105 inserts IFG of the length determined by the inter-frame gap length determination unit 104 between Ethernet frames.

Figure 13:
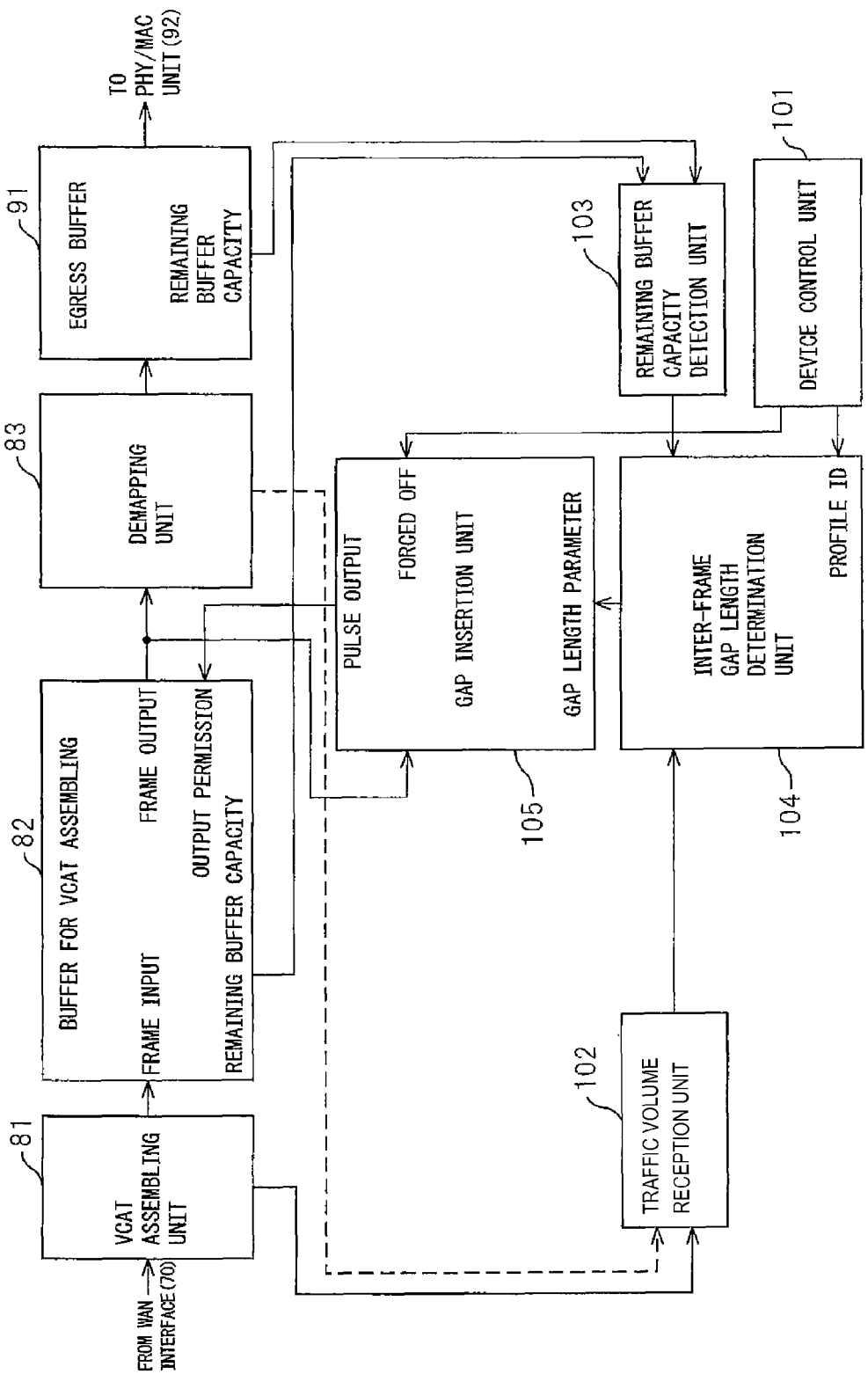
FIG. 13 is a view illustrating the operation of the control unit depicted in FIG. 7.

FIG. 13 is a view illustrating the operation of the control unit 100 described in FIG. 7. The traffic volume reception unit 102 receives traffic volume information extracted from VCAT assembling unit 81 or the demapping unit 83. The traffic volume reception unit 102 outputs the traffic volume information to the inter-frame gap length determination unit 104.

The remaining buffer capacity detection unit 103 detects remaining buffer capacity of the buffer for VCAT assembling 82 and/or the egress buffer 91. The remaining buffer capacity detection unit 103 outputs the detected remaining buffer capacity of the buffer for VCAT assembling 82 and/or the egress buffer 91 and the traffic volume information to the inter-frame gap length determination unit 104.

The inter-frame gap length determination unit 104 may have a plurality of profiles that represent the relation of the traffic volume information and remaining buffer capacity relative to the length of IFG outputted based on such information. That is, the inter-frame gap length determination unit 104 can, by changing the profile, change the length of outputted IFG even when conditions imposed by the traffic volume information and the remaining buffer capacity are the same. With the plurality of profiles, the inter-frame gap length determination unit 104 can change the value of IFG in dependence on the buffer capacity and the network configuration in the second Ethernet frame transmission apparatus 5. The profile used is defined by profile ID designated by the device control unit 101.

The inter-frame gap length determination unit 104 determines the length of IFG based on the traffic volume information, the remaining buffer capacity of the buffer for VCAT assembling 82 and/or the egress buffer 91, and profile ID. The inter-frame gap length determination unit 104 may determine the length of IFG, for example, in accordance with an IFG table generated by software or stored in advance.

Figure 14:
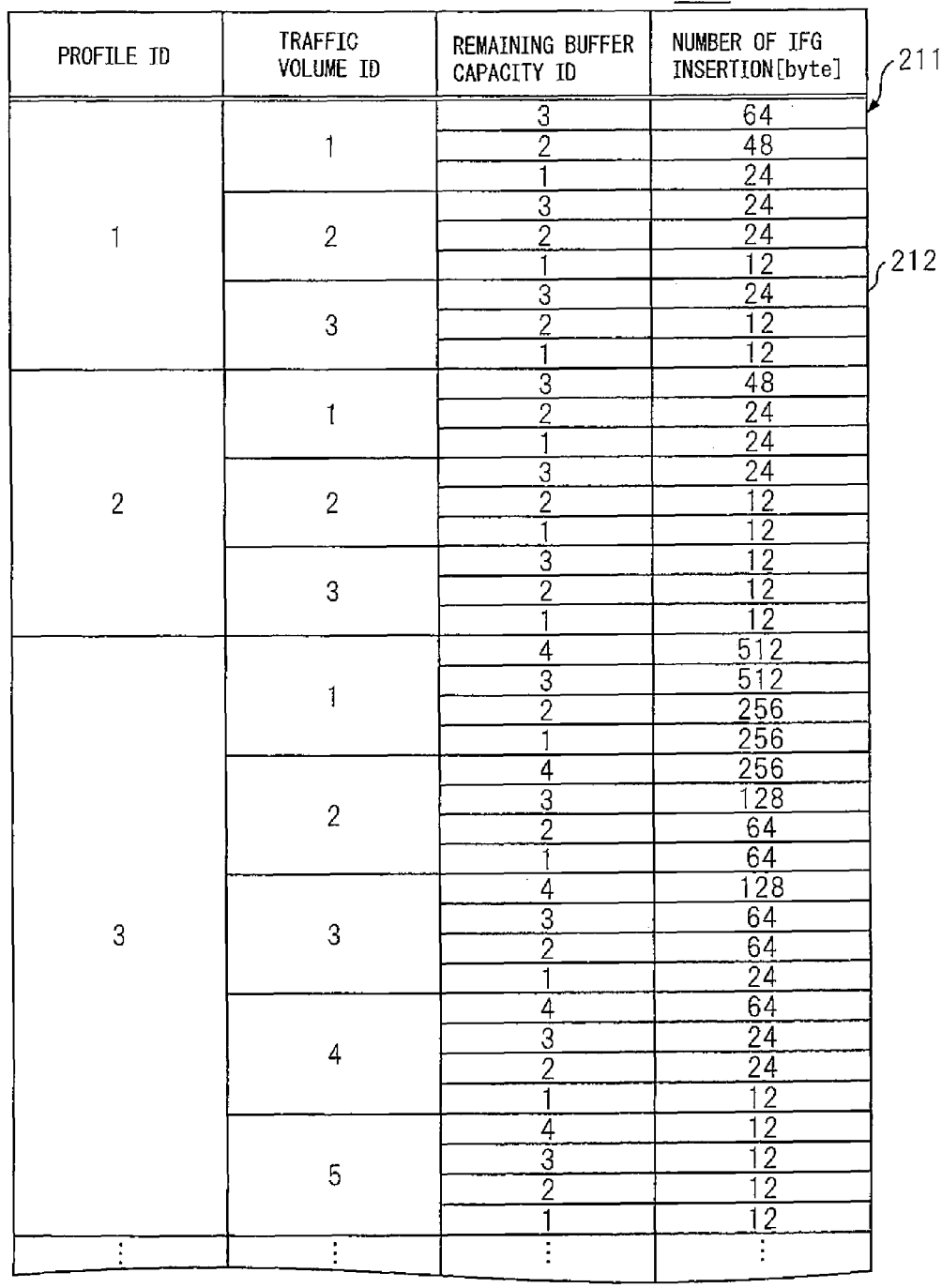
FIG. 14 is a view illustrating an example of setting of an IFG table.

FIG. 14 is a view illustrating an exemplary setting of an IFG table. IFG table 210 includes a profile ID field, a traffic volume ID field, a remaining buffer capacity ID field, and an IFG insertion number field. In the profile ID field, a profile ID designated by the device control unit 101 is stored.

In the traffic volume ID field, a traffic volume ID designated by traffic volume information is stored. In the remaining buffer capacity ID field, a remaining buffer capacity ID indicating remaining buffer capacity of the buffer for VCAT assembling 82 and/or egress buffer 91 is stored. In the IFG insertion number field, byte length of IFG that is determined based on a combination of various ID designated by profile ID field, traffic volume ID field, and remaining buffer capacity ID field, is stored.

For example, the line denoted by reference numeral 211 designates the length of inserted IFG to be 64 bytes, when the profile ID is "1", the traffic volume ID is "1", and the remaining buffer size ID is "3". The line denoted by reference numeral 212 designates the length of inserted IFG to be 24 bytes, when the profile ID is "1", the traffic volume ID is "3", and the remaining buffer size ID is "3".

A magnitude relationship of the traffic volume ID "1" to "3" is such that the traffic volume ID of "1" represents a state of low traffic volume, the traffic volume ID of "3" represents a state of high traffic volume, and the traffic volume ID of "2" represents an intermediate state between them. The magnitude relationship of the remaining buffer capacity ID "1" to "3" is such that the remaining buffer capacity ID of "1" represents a state of small remaining buffer capacity, the remaining buffer capacity ID of "3" represents a state of large remaining buffer capacity, and the remaining buffer capacity ID of "2" represents an intermediate state between them.

In the condition indicated by reference numeral 212 of this example, even in a state of relatively high traffic volume ID of "3", IFG of length "24" bytes that is longer than the minimum IFG of "12" bytes provided in IEEE 802.3 is inserted between Ethernet frames. Thus, in a state of relatively high traffic volume, shaping effect is obtained so that concentration of traffic volume is relaxed, and burst traffic is leveled.

In order to determine IFG based on the remaining buffer capacity both of the buffer for VCAT assembling 82 and of the egress buffer 91, two remaining buffer capacity ID fields may be provided in IFG table 210. Alternatively, the inter-frame gap length determination unit 104 may select and use the smaller remaining buffer capacity ID from two remaining buffer capacity IDs respectively indicating remaining buffer capacity of the buffer for VCAT assembling 82 and the egress buffer 91 as the representative remaining buffer capacity ID.

The gap length parameter indicating the length of IFG determined by the inter-frame gap length determination unit 104 is inputted to the gap insertion unit 105. The gap insertion unit 105 detects Start of Frame (SOF) and End of Frame (EDF) which are assembled by VCAT assembling unit 81 and outputted by the buffer for VCAT assembling 82.

The gap insertion unit 105 controls the frame-sending operation of sending frames from the buffer for VCAT assembling 82 to the demapping unit 83 by outputting of or stopping output of pulse signal instructing output permission of frames. The buffer for VCAT assembling 82 outputs frames to the demapping unit 83 upon receiving the pulse signal instructing output or no output of frames from the gap insertion unit 105.

The gap insertion unit 105 inserts IFG as designated by the gap length parameter between Ethernet frames by controlling interval between frames outputted from the buffer for VCAT assembling 82. In order to lengthen IFG and delay sending of Ethernet frames, it is required to retain data to be transmitted for the delaying period. The buffer for VCAT assembling 82 of relatively large capacity is provided in the second Ethernet frame transmission apparatus 5 for assembling of VCAT. Even if capacity of the egress buffer 91 is small, by controlling output of frames from the buffer for VCAT assembling 82, it is possible to retain data transmitted for the period required for delaying Ethernet frames.

In case where control of IFG in accordance with the present embodiment is not desired, the gap insertion unit 105 may be configured such that it receives forced OFF signal from the device control unit 101. Upon receiving the forced OFF signal, the gap insertion unit 105 stops above-described function of adjusting the length of IFG.

Figure 15:
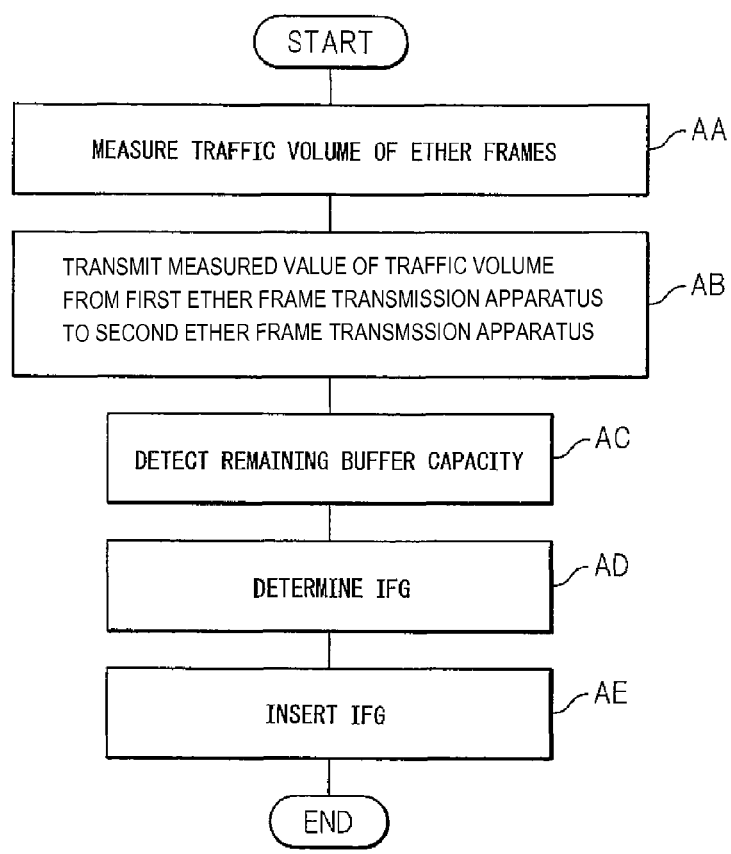
FIG. 15 is a view illustrating the control method for controlling IFG.

FIG. 15 is a view useful for illustrating the method for controlling IFG. Each of following operations AA to AE may be a step. In operation AA, the traffic volume measurement unit 62 of the first Ethernet frame transmission apparatus 3 measures the value of traffic volume of Ethernet frames to be transmitted to the second Ethernet frame transmission apparatus 5 via the synchronous network 4.

In operation AB, the traffic volume transmission unit 63 transmits traffic volume information indicating the measured value of traffic volume to the traffic volume reception unit 102 of the second Ethernet frame transmission apparatus 5.

In operation AC, the remaining buffer capacity detection unit 103 detects remaining buffer capacity of the buffer for VCAT assembling 82 and/or the egress buffer 91. Processing in operation AC is not indispensable, and if, in next operation AD, IFG is determined without using the remaining buffer capacity as a condition, operation AC may be omitted. It does not matter if operation AA and AB or operation AC is carried out first.

In operation AD, the inter-frame gap length determination unit 104 determines the length of IFG based on the profile ID designated by the device control unit 101, traffic volume information received in operation AB, and the remaining buffer capacity detected in operation AC. The inter-frame gap length determination unit 104 may determine the length of IFG based on traffic volume information or on traffic volume information and the profile ID, irrespective of the remaining buffer capacity detected in operation AC.

In operation AE, the gap insertion unit 105 inserts IFG of the length determined in operation AD between Ethernet frames.

In accordance with the present embodiment, in an Ethernet frame transmission apparatus that transmits Ethernet frames via SONET/SDH synchronous network, it is possible to adjust traffic volume of Ethernet frames, whereby, in the Ethernet frame transmission apparatus that transmits Ethernet frames via SONET/SDH synchronous network, it is possible to smooth burst traffic of Ethernet frames, and achieves traffic shaping.

Also, in accordance with the present embodiment, in an Ethernet frame transmission apparatus such as P-P type Ethernet frame transmission apparatus, it becomes possible to provide traffic shaping function at low cost.

Figure 16:
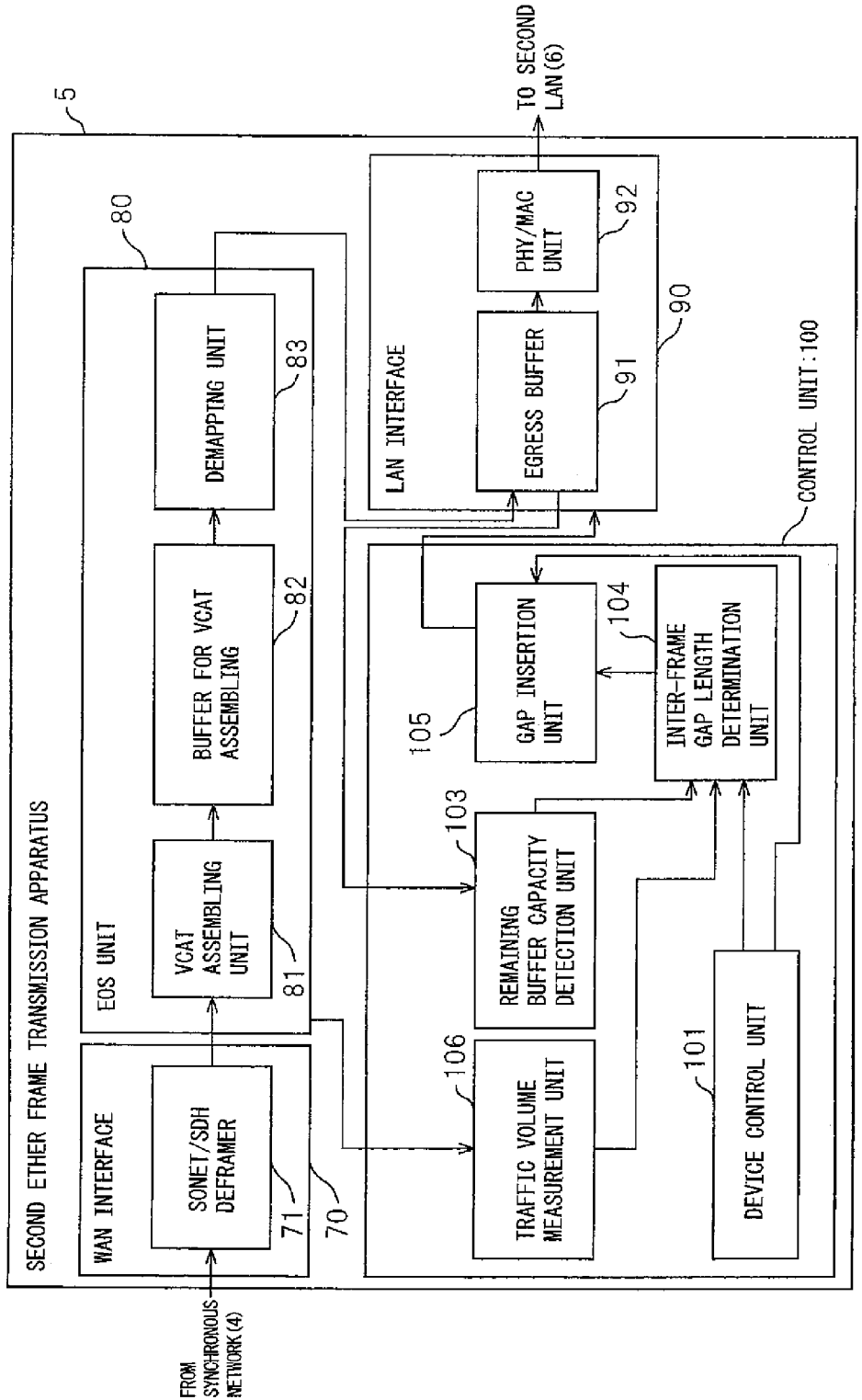
FIG. 16 is a schematic view illustrating the configuration of a seventh example of Ethernet frame transmission apparatus according to the embodiment.

FIG. 16 is a schematic view illustrating the configuration of a seventh example of Ethernet frame transmission apparatus according to the embodiment. FIG. 16 illustrates the configuration used in the case where Ethernet frames are received by the second Ethernet frame transmission apparatus 5. The second Ethernet frame transmission apparatus 5 has the configuration similar to the configuration illustrated in FIG. 7, and constituents similar to the constituents in FIG. 7 are denoted by the same reference numerals as used in FIG. 7.

The control unit 100 of the second Ethernet frame transmission apparatus 5 illustrated in FIG. 16 includes the traffic volume measurement unit 106. A part or all of processing performed by the traffic volume measurement unit 106 may be carried out by a programmable LSI such as FPGA. A part or all of the traffic volume measurement unit 106 may be realized by a dedicated hardware circuit. The control unit 100 may include a processor and a memory storing its operation program. A part or all of processing performed by the traffic volume measurement unit 106 may be carried out by the processor executing its operation program. Traffic volume measurement unit 106 may also be referred to as traffic volume measurer 106.

FIG. 17 is a view useful for illustrating the operation of the control unit 100 depicted in FIG. 16. The traffic volume measurement unit 106 measures traffic volume of Ethernet frames outputted from the demapping unit 83. Method of the traffic volume measurement unit 106 for measuring traffic volume is the same as the method illustrated above with reference to FIG. 8 and FIG. 9.

The remaining buffer capacity detection unit 103 detects remaining buffer capacity of the egress buffer 91. The inter-frame gap length determination unit 104 determines the length of IFG based on traffic volume measured by the traffic volume measurement unit 106, the remaining buffer capacity detected by the remaining buffer capacity detection unit 103, and the profile ID designated by the device control unit 101. Method of determining the length of IFG used by the inter-frame gap length determining unit 104 may be the same as the method described above with reference to FIG. 7 and FIG. 13.

The gap insertion unit 105 detects start (SOF: Start of Frame) and end (EOF: End of Frame) of Ethernet frames outputted from the egress buffer 91. The gap insertion unit 105 controls timing for outputting Ethernet frame from the egress buffer 91 such that IFG of the length determined by the inter-frame gap length determination unit 104 is inserted between Ethernet frames.

In accordance with the present embodiment, in the second Ethernet frame transmission apparatus 5 that receives Ethernet frames from SONET/SDH synchronous network 4, it is possible to measure traffic volume of Ethernet frames. Therefore, in the first Ethernet frame transmission apparatus 3 on the transmission side needs not measure traffic volume of Ethernet frames. Also, traffic volume measured in the first Ethernet frame transmission apparatus 3 needs not be transmitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An inter-frame gap controller communicating with a transmission apparatus having a traffic volume transmitter, comprising:
   a traffic volume receiver in a reception apparatus that receives a value of traffic volume from the transmission apparatus;
   an inter-frame gap length determiner that receives, via the traffic volume receiver, detected current traffic volume of Ethernet frames which are converted to synchronous frames and are transmitted over a synchronous network, the detected current traffic volume of Ethernet frames being transmitted from the traffic volume transmitter in the transmission apparatus over the synchronous network and received by the inter-frame gap length determiner, and determines a length of an inter-frame gap based on the detected current traffic volume of Ethernet frames, where the determined length of inter-frame gap enables smoothing of burst traffic; and
   a gap inserter that inserts an inter-frame gap of the length determined by said inter-frame gap length determiner between Ethernet frames which are converted from said synchronous frames;
   wherein the traffic volume transmitter includes:
      a traffic volume measurer that measures traffic volume of the Ethernet frames to be transmitted to said inter-frame gap controller via the synchronous network by counting the Ethernet frames to be transmitted via the synchronous network in a predetermined time period; and
      a transmitter that transmits the value of traffic volume measured by the volume measurer to said inter-frame gap length determiner.

2. The traffic volume transmitter as claimed in claim 1, wherein said traffic volume measurer measures the ratio between said Ethernet frames transmitted via said synchronous network and the inter-frame gap.

3. The traffic volume transmitter as claimed in claim 1, wherein said traffic volume measurer measures the remaining capacity of a transmission buffer that retains said Ethernet frames transmitted via said synchronous network.

4. The traffic volume transmitter as claimed in claim 1, wherein said transmitter transmits the value of traffic volume over said synchronous network by having said value of traffic volume mapped to overhead, pay load, of said synchronous frames transmitted over SONET/SDH network as said synchronous network, or to control frames used ii a predetermined communication procedure implemented on said SONET/SDH network.

5. The inter-frame gap controller as claimed in claim 1, further comprising:
   a remaining buffer capacity measurer that measures remaining capacity of the frame buffer retaining said Ethernet frames between which said inter-frame gap is to be inserted;
   wherein said inter-frame gap length determiner determines said length of inter-frame gap based on said traffic volume and said remaining capacity of the frame buffer.

6. The inter-frame gap controller as claimed in claim 1, wherein said inter-frame gap length determiner comprises a table specifying said length of inter-frame gap in correspondence to said traffic volume.

7. A transmission apparatus comprising:
   the inter-frame gap controller as claimed in claim 1;
   a synchronous frame receiver that receives said Ethernet frames transmitted over said synchronous network; and
   a converter that converts said received synchronous frames to Ethernet frames.

8. A transmission apparatus that transmits to an inter-frame gap length controller a value of traffic volume of Ethernet frames to be converted to synchronous frames and transmitted over a synchronous network, the inter-frame gap length controller inserting an inter-frame gap between Ethernet frames which are converted from said synchronous frames to smooth burst traffic, the inter-frame gap having a length based on detected current traffic volume of Ethernet frames, comprising:
   a traffic volume transmitter including
      a traffic volume measurer that measures traffic volume of the Ethernet frames to be transmitted to the inter-frame gap length controller via said synchronous network by counting the Ethernet frames to be transmitted via said synchronous network in a predetermined time period, and
      a transmitter that transmits the value of traffic volume measured by the traffic volume measurer to the inter-frame gap length controller over the synchronous network;
   a converter that converts Ethernet frames to said synchronous frames; and
   a synchronous frame transmitter that transmits said synchronous frames to said synchronous network.

9. A method for controlling inter-frame gap comprising:
   receiving, at an inter-frame gap length determiner via a traffic volume receiver in a reception apparatus, detected current traffic volume of Ethernet frames which are converted to synchronous frames and are transmitted over a synchronous network, the detected current traffic volume of the Ethernet frames is measured by a traffic volume measurer in a transmission apparatus by counting the Ethernet frames in a predetermined time period and transmitted from a traffic volume transmitter in the transmission apparatus over the synchronous network and received by the inter-frame gap length determiner via the traffic volume receiver in the reception apparatus;
   determining, in the reception apparatus, a length of an inter-frame gap based on the detected current traffic volume of Ethernet frames transmitted from the traffic volume transmitter in the transmission apparatus over the synchronous network, where the determined length of the inter-frame gap enables smoothing of burst traffic; and
   inserting, in the reception apparatus, the inter-frame gap of said determined length between Ethernet frames which are converted from said synchronous frames.

10. The method for controlling the inter-frame gap as claimed in claim 9, wherein the traffic volume is measured in a transmission apparatus that transmits said Ethernet frames via said synchronous network.

11. The method for controlling the inter-frame gap as claimed in claim 9, wherein the traffic volume is measured in a reception apparatus that receives said Ethernet frames via said synchronous network.

* * * * *

UNITED STATES PATENT AND TRADEMARK OFFICE
CERTIFICATE OF CORRECTION

| | | |
|---|---|---|
| PATENT NO. | : 9,054,824 B2 | Page 1 of 1 |
| APPLICATION NO. | : 13/370806 | |
| DATED | : June 9, 2015 | |
| INVENTOR(S) | : Yasushi Tateno | |

It is certified that error appears in the above-identified patent and that said Letters Patent is hereby corrected as shown below:

In the Claims

Column 17, Line 55:

In Claim 4, delete "ii" and insert --in--.

Signed and Sealed this
Fifteenth Day of September, 2015

Michelle K. Lee
*Director of the United States Patent and Trademark Office*